United States Patent
Mager et al.

(10) Patent No.: US 9,560,571 B2
(45) Date of Patent: Jan. 31, 2017

(54) METHOD FOR PERFORMING MOBILE COMMUNICATIONS AND MOBILE RADIO COMMUNICATION TERMINAL DEVICE

(71) Applicant: Intel IP Corporation, Santa Clara, CA (US)

(72) Inventors: Stefan Mager, Nuremberg (DE); Sharada Raghuram, Buffalo Grove, IL (US); Michael Esch, Nuremberg (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/670,498

(22) Filed: Mar. 27, 2015

(65) Prior Publication Data

US 2016/0286454 A1   Sep. 29, 2016

(51) Int. Cl.
```
G06F 15/16    (2006.01)
H04W 36/30    (2009.01)
H04W 24/08    (2009.01)
H04W 36/16    (2009.01)
H04L 29/06    (2006.01)
```

(52) U.S. Cl.
CPC .......... *H04W 36/30* (2013.01); *H04L 65/4076* (2013.01); *H04W 24/08* (2013.01); *H04W 36/165* (2013.01)

(58) Field of Classification Search
CPC .. H04W 36/0083; H04W 36/30; H04W 24/10; H04W 36/14; H04W 36/04; H04W 36/0094; H04W 36/00
USPC ......... 455/436–439, 442–444; 370/252, 311, 370/331, 338
See application file for complete search history.

(56) References Cited

U.S. PATENT DOCUMENTS

| | | | |
|---|---|---|---|
| 2011/0305184 A1 | 12/2011 | Hsu | |
| 2013/0301509 A1* | 11/2013 | Purnadi | H04L 65/4076 370/312 |
| 2015/0085829 A1* | 3/2015 | Bawaskar | H04W 36/30 370/332 |

FOREIGN PATENT DOCUMENTS

| | | |
|---|---|---|
| EP | 2152030 A1 | 2/2010 |
| EP | 2810480 A1 | 12/2014 |
| WO | 2010053624 A1 | 5/2010 |

(Continued)

OTHER PUBLICATIONS

Nguyen, Ngoc-Duy; Bonnet, Christian: "Service Continuity for eMBMS in LTE/LTE-Advanced Network: Standard Analysis and Supplement", 11th IEEE Consumer Communication and Networking Conference, Jan. 10-13, 2014.

(Continued)

*Primary Examiner* — Sam Bhattacharya
(74) *Attorney, Agent, or Firm* — Viering, Jentschura & Partner mbB

(57) ABSTRACT

A method for performing mobile communications may include receiving a first multimedia broadcast or multicast stream from a serving cell; determining whether or not a neighbor cell is capable of providing the first multimedia broadcast or multicast stream to generate a first determination result; and initiating neighbor cell protocol operations with the neighbor cell according to a first set of threshold criteria if the first determination result is negative and initiating neighbor cell protocol operations with the neighbor cell according to a second set of threshold criteria if the first determination result is positive. The neighbor cell protocol operations are cell measurements of the neighbor cell or cell reselection to the neighbor cell.

20 Claims, 10 Drawing Sheets

(56) References Cited

FOREIGN PATENT DOCUMENTS

WO 2011057037 A2 5/2011
WO 2013115696 A1 8/2013

OTHER PUBLICATIONS

Extended European Search Report received for corresponding European Patent Application No. 16154714.6 mailed on Sep. 20, 2016, 14 pages of Search Report.
Alcatel-Lucent Shanghai Bell et al., "Enhancement of cell reselection for MBMS service continuity", 3GPP TSG-RAN WG2 Meeting #73 bis, R2-112230, Apr. 2011, 4 pages.
Christophoros Christophorou et al., "An Enhanced Approach for Efficient MBMS Handovers in 3G Networks", IEEE Symposium on Computers and Communications, 2008, pp. 362-367.

\* cited by examiner

METHOD FOR PERFORMING MOBILE COMMUNICATIONS AND MOBILE RADIO COMMUNICATION TERMINAL DEVICE

TECHNICAL FIELD

Various embodiments relate generally to a method for performing mobile communications and a mobile radio communication terminal device.

BACKGROUND

Recent additions to the 3rd Generation Partnership Project (3GPP) standard include provisions directed towards Multimedia Broadcast Multicast Services (MBMS) and Enhanced MBMS (eMBMS). The MBMS and eMBMS protocols are intended for a variety of broadcast and multicast services, such as mobile TV and radio broadcasting to be delivered to users with existing 3GPP network wireless resources. As these services use wireless network resources, the reception quality of MBMS and eMBMS is dependent on the radio link quality that a User Equipment (UE) with a serving cell. UEs experiencing poor radio link conditions may correspondingly experience a low quality of eMBMS reception.

The geographic placement of eMBMS-enabled cells may be non-uniform, and accordingly the service area of eMBMS may vary significantly. For example, eMBMS may only be available in specific geographic locations, and accordingly may only be available to nearby users. Furthermore, the availability of eMBMS may vary over time, as specific eMBMS-enabled cells may only provide eMBMS transmissions during certain times, such as e.g. during a particular event. Additionally, different geographic groups of eMBMS-enabled cells may provide different eMBMS streams. Consequently, a user may only be able to access specific eMBMS streams in certain areas dependent on whether the nearby eMBMS-enabled cells are broadcasting the specific eMBMS stream.

A user may therefore experience geographic regions where a particular desired eMBMS stream is not available. Additionally, a user may experience geographic regions where no eMBMS service is available at all. A user who is engaged in an eMBMS session (i.e. receiving a specific eMBMS stream) and subsequently leaves the eMBMS service area may thus experience a significant decrease in the reception quality of the eMBMS stream or even have the active eMBMS session terminated completely. A user who is leaving the eMBMS service area may therefore wish to maintain an existing eMBMS connection at high quality for as long as possible. In other words, a user may desire to stay continue receiving a desired eMBMS stream by maintaining a connection to the respective transmitting eMBMS-enabled cell instead of performing cell reselection to a cell that does not provide the desired eMBMS stream (i.e. a non-eMBMS cell or an eMBMS cell that is not providing the desired eMBMS stream). A user may thus wish to maintain reception of an existing eMBMS stream even if an incompatible cell (i.e. a non-eMBMS cell or an eMBMS cell that is not providing the desired eMBMS stream, as will be referred to hereafter) may be able to provide a higher level of conventional cellular service (such as e.g. voice or data). A user may additionally desire to forego measurement gaps due to the negative effects these measurement gaps may have on the reception quality of the desired eMBMS stream.

However, the current 3GPP standard does not consider active eMBMS sessions in the decision to perform neighbor cell measurements or cell reselection from a UE in idle mode. For example, the current Long Term Evolution (LTE) standard dictates that a UE in idle mode is to initiate neighbor cell measurements and/or cell reselection based on serving cell signal power and signal quality measurements. The LTE standard specifies periodic measurements of the Reference Signal Receive Power (RSRP, i.e. signal power) and Reference Signal Receive Quality (RSRQ, i.e. signal quality) of a reference signal received at a UE from the serving cell. The UE may then compare the measured RSRP and/or RSRQ values to network-provided thresholds to determine if neighbor cell measurements and/or cell reselection is necessary. A UE may be instructed by the network to perform neighbor cell measurements of nearby cells or cell reselection if the measured serving cell RSRP and/or measured serving cell RSRQ falls below the network-defined thresholds, which may indicate a reduced quality of service for the user. The thresholds may be network-provided, and the cell reselection thresholds may be lower than the neighbor cell measurement threshold to ensure neighbor cell measurements will typically be performed prior to reselection.

The standard thus does not consider the presence of active eMBMS streams when determining if neighbor cell measurements and/or cell reselection is appropriate. The standard also does not consider whether nearby candidate cells (e.g. for cell measurement and/or reselection) are capable of providing the active eMBMS stream. A user may therefore be engaged in an eMBMS session and may be leaving the serving area of the current cell and entering the service of area of a nearby incompatible cell (i.e. a cell that does not provide eMBMS or is not providing the active eMBMS stream). As the user is leaving the service area of the serving cell, cell measurements may be triggered on nearby candidate cells, including the nearby incompatible cell. Consequently, the user may experience a drop in eMBMS stream quality due to the performance of standard-dictated measurement gaps required to measure nearby candidate cells. The measurement gaps may even be used to search and measure incompatible cells (i.e. non-eMBMS cells or eMBMS cells that do not provide the desired eMBMS stream), such as the incompatible cell which the user is entering the service area thereof. In addition to a reduction in eMBMS stream quality, the UE may select the incompatible cell as the new serving cell, thereby terminating the active eMBMS session. A user may thus not wish to perform measurements on incompatible cells if an eMBMS session is active, or may wish to wait until absolutely necessary to consider incompatible cells for measurement. Furthermore, a user may wish to not perform reselection to an incompatible cell if an eMBMS session is active, or may wish to wait until reselection is absolutely necessary to consider incompatible cells for reselection. It therefore may be advantageous for a UE to consider whether or not an eMBMS session is active as well as the eMBMS capabilities in the decision to initiate cell measurements and cell reselection.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1A:
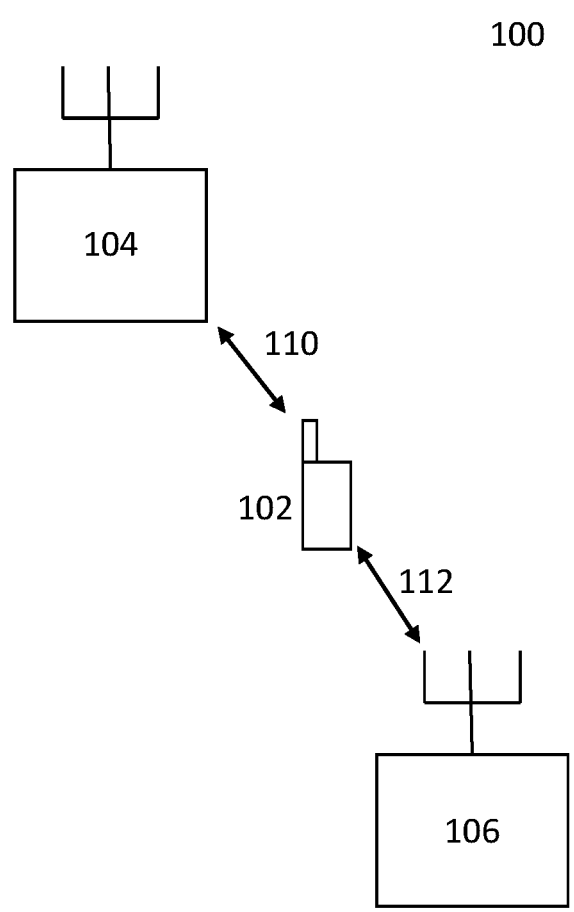
FIGS. 1A-1B show a mobile radio communication system.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

As used herein, a "cell" in the context of telecommunications may be understood as a sector of a base station. A base station may thus be composed of one or more "cells" (or sectors), where each cell includes at least one unique communication channel. An "inter-cell handover" may thus be understood as a handover from a first "cell" to a second "cell", where the first "cell" is different than the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different base station. "Intra-base station handovers" may be understood as a handover from a first "cell" to a second "cell", where the first "cell" is provided at the same base station as the second "cell". A "serving cell" may be understood as a "cell" which a mobile terminal is currently connected to according to the mobile communication protocols of the associated mobile communication network standard.

Neighbor cell measurements and/or cell reselection may have a significant negative impact on the reception of active enhanced Multimedia Broadcast Multicast Service (eMBMS) sessions. However, the current 3rd Generation Partnership Project (3GPP) mobile communication standard does not consider active eMBMS sessions in the decision to perform neighbor cell measurements or cell reselection, and furthermore does not consider the eMBMS capabilities of candidate cells for cell measurement and cell reselection. This problem may be amplified for User Equipments (UEs) that are receiving a desired eMBMS stream and are leaving the service area associated with the desired eMBMS stream, e.g. entering an area where the desired eMBMS stream is not available. For example, a UE approaching a the boundary of the service area of the current serving cell may initiate neighbor cell measurements and/or cell reselection based on the received signal from the serving cell on nearby candidate cells. The UE may consider all candidate cells equally, and therefore may initiate cell measurements and/or cell reselection on nearby candidate cells that do not provide the desired eMBMS stream, i.e. on nearby incompatible cells. Accordingly, the desired eMBMS stream would be terminated if one of these incompatible cells was selected for reselection. Additionally, neighbor cell measurements on nearby candidate cells may require temporary lapses in reception with the serving cell, thereby deteriorating the reception quality of the desired eMBMS stream. As incompatible cells are considered equivalently with compatible cells for cell measurement, cell measurements may be performed on incompatible cells. The cell measurements of incompatible cells may therefore not offer any advantages in continuing reception of the desired eMBMS stream, as cell reselection to an incompatible cell would terminate the desired eMBMS stream. Consequently, it may be advantageous to consider the presence of active eMBMS sessions as well as the eMBMS capabilities of nearby candidate cells in the decision to perform neighbor cell measurements and/or cell reselection. It may additionally be advantageous to consider the current quality of an any active eMBMS sessions.

As previously detailed, the current 3GPP standard bases the decision for a UE in idle mode to perform neighbor cell measurements and cell reselection on measured serving cell Reference Signal Receive Power (RSRP) and Reference Signal Receive Quality (RSRQ). A UE in idle mode may periodically measure a reference signal received from the serving cell in order to obtain the requisite RSRP and RSRQ measurements. The UE may then compare the measured serving cell RSRP and RSRQ to network-provided cell measurement and cell reselection thresholds in order to determine whether or not cell measurements and/or reselection should be performed. The network-provided cell measurement threshold is conventionally higher than the network-provided cell reselection threshold. Accordingly, a UE operating according to the standard will initiate neighbor cell measurements if the measured serving cell RSRP falls below the network-provided RSRP measurement threshold and above the network-provided RSRP reselection threshold. Similarly, the UE will begin performing neighbor cell measurements if the measured serving cell RSRQ falls below the network-provided RSRQ measurement threshold and above the network-provided RSRQ reselection threshold. Likewise, the UE will begin initiating cell reselection if the measured serving cell RSRP or RSRQ falls below the network-provided RSRP or RSRQ reselection thresholds, respectively.

The UE may consider all nearby candidate cells for cell measurement and/or reselection, and therefore may consider incompatible cells for cell measurement and reselection even if an eMBMS session is active. The initiation of neighbor cell measurements and, in particular, cell reselection on incompatible cells may have a serious negative impact on the quality of any active eMBMS streams. Neighbor cell measurements may require the use of measurement gaps in single receiver UEs, and thus require periodic breaks in reception from the serving cell to perform measurements of nearby cells. The enactment of these measurement gaps may consequently result in a deterioration in reception quality of an active eMBMS session, which may depend on a consistent connection to the serving cell to enable a suitable user experience. As active eMBMS sessions are not considered, these measurement gaps may even be used to search and measure incompatible cells (i.e. non-eMBMS cells or eMBMS cells that do not provide the active eMBMS stream), and a subsequent cell reselection to one of these incompatible cells will result in the complete termination of the active eMBMS stream.

FIG. 1A shows mobile radio communication system 100. Mobile radio communication terminal device 102, hereafter referred to as UE 102, may receive a plurality of radio signals from one or more base stations 104 and 106 over respective air interfaces 110 and 112. Base stations 104 and 106 may be e.g. NodeBs (e.g. in accordance with a Universal Mobile Telecommunications System (UMTS) network) or eNodeBs (eNBs) (e.g. in accordance with the Long Term Evolution (LTE) network). Each of base stations 104 and 106 may be capable of supporting a variety of different cellular services in accordance with the network configuration. It is to be noted that although the further description details a configuration of mobile radio communication system 100 in accordance with an LTE or LTE-Advanced (LTE-A) configuration, any other mobile radio communication system 100 may be provided, such as a 3GPP mobile radio communication system, 4GPP (4th Generation Partnership Project) mobile radio communication system, and the like. Additionally, while the following descriptions and examples may specifically refer to eMBMS protocols, it should be understood by those skilled in the art that the same principles and approaches may be similarly applied to MBMS protocols and other multicast/broadcast multimedia services.

Mobile radio communication system 100 may thus be configured according to an LTE or LTE-A architecture. UE 102 may receive radio signals from eNBs 104 and 106 according to the corresponding LTE protocol. It is to be noted that although FIG. 1A illustrates UE 102 as configured to receive radio signals from only two base stations, this scenario is exemplary in nature and more or less base stations/macrocells or other network components (microcells, picocells, femtocells/Home eNodeBs, repeaters, etc.) may alternatively be provided.

Figure 1B:
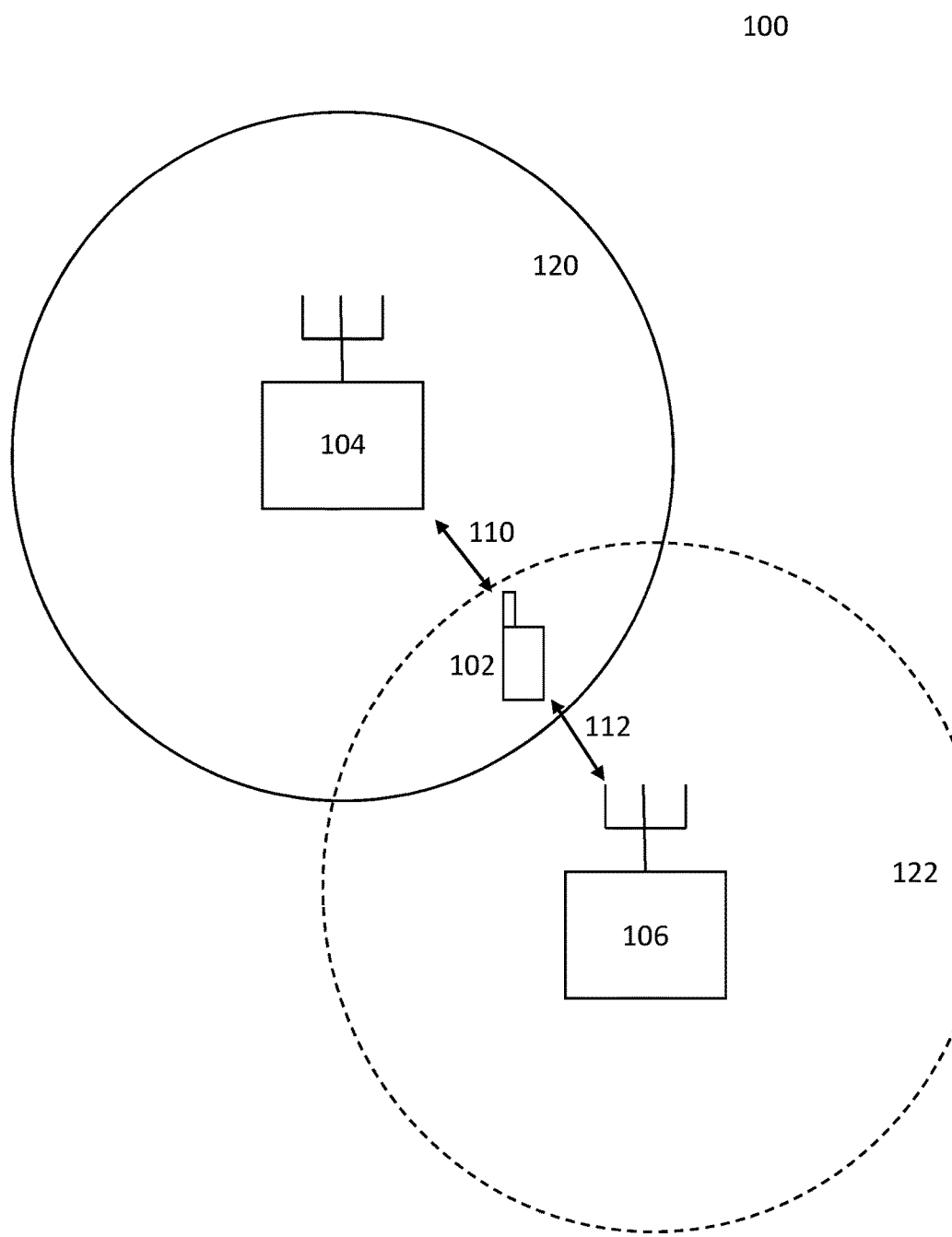

As shown in FIG. 1B, each of eNBs 104 and 106 may have a different coverage area. For example, eNB 104 may have coverage area 120 as denoted by the solid-lined circle. Similarly, eNB 106 may have coverage area 122 as denoted by the dashed circle. Each of coverage areas 120 and 122 may cover a different geographic area, and eNBs 104 and 106 may be capable of providing a high quality of service to users that are located within the respectively associated coverage areas 120 and 122. The quality of service provided by eNBs 104 and 106 may decrease as a user moves further away from the respective eNB, e.g. towards the cell edge, and vice versa for a user moving closer to the respective eNB. The quality of service provided by eNBs 104 and 106 may substantially decrease for users located outside of the respective coverage area. Although coverage areas 120 and 122 are illustrated as having a distinct circular shape, the shape, size, and scale of coverage areas 120 and 122 is merely exemplary and is not intended to represent a realistic cellular network coverage area.

A mobile communication terminal device such as UE 102 may perform periodic measurements of nearby cells in order to identify neighboring cells that may offer a high reception quality. As previously detailed, the network standard may dictate when such neighbor cell measurements should be performed, and UE may thus base the decision to perform neighbor cell measurements on network-provided criteria. For example, UE 102 may be in idle mode, and may be configured to periodically measure the Reference Signal Receive Power (RSRP) and Reference Signal Receive Quality (RSRQ) of a reference signal received from the current serving eNB. UE 102 may then base the decision to being performing neighboring cell measurements on an analysis of the measured serving cell RSRP and RSRQ.

For example, UE 102 may be in idle mode and may be camping on eNB 104, i.e. eNB 104 may be currently acting as the serving eNB for UE 102 (Note that for the purposes of simplicity of explanation, an eNB may be referred to as the "serving eNB" in order to indicate that a cell located at the eNB is acting as the serving cell to a UE; similarly, an eNB may be referred to as "transmitting a signal" in order to denote that a cell located at the eNB is transmitting a signal). UE 102 may thus periodically measure the RSRP and RSRQ of a reference signal transmitted by eNB 104 in order to analyze the radio link quality associated with serving eNB 104.

UE 102 may then compare the measured RSRP and RSRQ of serving eNB 104 to a signal power threshold and signal quality threshold, respectively. UE 102 may then initiate neighbor cell measurements by comparing the measured RSRP or RSRQ (or alternatively both) with one or more thresholds. For example, UE 102 may be provided with a signal power measurement threshold, signal power reselection threshold, signal quality measurement threshold, and a signal quality reselection threshold. The thresholds may be provided by the network, such as e.g. received as control information from serving eNB 104. UE 102 may compare the measured RSRP and RSRQ to the respective signal power and signal quality measurement and reselection thresholds to determine if neighbor cell measurements or cell reselection should be performed.

As previously detailed, the measurement thresholds may be greater than the reselection thresholds. UE 102 may initiate neighbor cell measurements if the measured RSRP falls below the signal power measurement threshold but exceeds the signal power reselection threshold. UE 102 may initiate cell reselection procedures if the measured RSRP falls below the signal power reselection threshold. UE 102 may take no measurement or reselection action if the measured RSRP exceeds the signal power measurement threshold.

Similarly, UE 102 may initiate neighbor cell measurements if the measured RSRQ falls below the signal quality measurement threshold but exceeds the signal quality reselection threshold. UE 102 may initiate cell reselection procedures if the measured RSRQ falls below the signal quality reselection threshold. UE 102 may take no measurement or reselection action if the measured RSRQ exceeds the signal quality measurement threshold.

As both the measured RSRP and RSRQ are indicative of radio link quality with the serving cell, UE 102 may be configured to initiate neighbor cell measurements or cell reselection upon a determination that the radio link quality from serving eNB 104 is poor. UE 102 may be configured to initiate neighbor cell measurements or cell reselection based on whether either or both of the measured RSRP and RSRQ fall below the respective signal power and signal quality measurement and reselection threshold.

UE 102 may therefore be configured to initiate neighbor cell measurements and/or cell reselection based on the measured RSRP and measured RSRQ of the serving eNB, e.g. eNB 104 as illustrated in FIG. 1B. This RSRP- and RSRQ-based approach is intended to ensure that the reception quality of UE 102 remains at high levels. For example, UE 102 may be moving away from serving eNB 104, and may be approaching the cell edge of coverage area 120. Consequently, the increased distance between UE 102 and eNB 104 may lead to a decrease in radio link quality, which may be in turn reflected by a decrease in measured RSRP and/or RSRQ in signal received from eNB 104. UE 102 may either begin to perform measurements of neighboring cells or perform cell reselection if the measured RSRP and/or RSRQ falls below given thresholds. This approach may ensure that UE 102 remains connected to a serving eNB that provides a strong radio link to UE 102.

UE 102 may therefore maintain a strong connection to a serving eNB by performing cell measurements and cell reselection when necessary. However, UE 102 may not consider whether an eMBMS session is active, and may not consider whether candidate cells for cell measurement and cell reselection support the active eMBMS session. UE 102 may therefore initiate cell measurement and/or cell reselection on incompatible cells based on RSRP and RSRQ measurements.

The initiation of cell measurement and/or cell reselection of incompatible cells may directly result in a decrease of eMBMS reception quality if UE 102 is actively receiving an eMBMS stream. For example, UE 102 may be engaged in an eMBMS (or MBMS) session with serving eNB 104, and may be actively receiving a broadcast or multicast stream from serving eNB 104 such as e.g. mobile television or commercial radio. UE 102 and serving eNB 104 may thus be capable of supporting eMBMS services. The user operating UE 102 may desire to maintain a high quality of reception of the active eMBMS stream in order to enjoy a satisfactory user experience.

However, the quality of the active eMBMS stream may drop as UE 102 moves into the cell edge of coverage area 120 of serving eNB 104. This drop in eMBMS stream quality may be reflected in a Forward Error Correction (FEC) Block Error Rate (BLER) or a video/audio decoder quality, as will be later described. A user operating UE 102 may thus wish to ensure that eMBMS stream quality remains satisfactory even as UE 102 moves away from the effective coverage area of serving eNB 104. However, the measured RSRP and measured RSRQ of serving eNB 104 may also be decreasing, and may decrease to such a level that UE 102 is triggered to initiate neighbor cell measurements or cell reselection of nearby candidate cells. As will be described, eMBMS stream quality may appreciably decrease or even terminate altogether as a result of either neighbor cell measurements or cell reselection.

For example, neighbor cell measurements may be composed of a series of periodic measurement gaps during which a single receiver UE must cease reception from a serving cell in order to receive and measure signals on different frequencies from other nearby cells. These periodic lapses in communication with the serving cell may directly contribute to a drop in reception quality with the serving cell, and all such reception quality-dependent services may see a corresponding drop in quality. UE 102 may be susceptible to such reductions in service quality triggered by the initiation of measurement gaps. For example, UE 102 may be a single receiver device, and accordingly may not be able to receive an eMBMS stream using the single receiver simultaneous to performing a measurement gap. Alternatively, UE 102 may be a multi-receiver device, but the other receivers may be unavailable to receive an eMBMS stream during a measurement gap, e.g. as the other receivers are being used for other purposes such as receiving paging messages. UE 102 may thus not be able to receive an eMBMS stream during the measurement gaps.

An active eMBMS session between UE 102 and serving eNB 104 may thus see a distinct decrease in eMBMS stream quality if neighbor cell measurements are initiated, as UE 102 may need to temporarily cease reception of the active eMBMS stream. Neighbor cell measurements, however, may be required based on measured serving cell RSRP and RSRQ measurements as UE 102 moves to the outer edges of coverage area 120 of serving eNB 102. As UE 102 moves toward the cell edge of coverage area 120, the serving cell RSRP and RSRQ measurements may fall below the requisite network-provided threshold for triggering neighbor cell measurements. UE 102 may thus initiate neighbor cell measurements. UE 102 may consider all nearby candidate cells for neighbor cell measurements, and thus may not consider whether or not nearby candidate cells are compatible (i.e. are providing the active eMBMS stream) or incompatible (i.e. are not providing the active eMBMS stream). Similarly, if the measured serving cell RSRP and/or RSRQ fall below the network-provided reselection thresholds, UE 102 may initiate cell reselection process, such as e.g. attempting to find a suitable new nearby cell to act as serving cell. However, UE 102 may consider all nearby candidate cells for reselection, and thus may consider incompatible cells for reselection. As previously detailed, reselection to an incompatible cell will result in termination of the active eMBMS stream.

Accordingly, it may be advantageous to consider both whether an eMBMS (or MBMS) session is active and the eMBMS capabilities of nearby candidate cells in the decision to initiate neighbor cell protocol interactions, i.e. measurements and/or cell reselection. For example, UE 102 may proceed according to the standard network protocol if no eMBMS session is active, and accordingly may consider all nearby candidate cells for cell measurement and reselection. However, if an eMBMS session is active, UE 102 may consider compatible cells and incompatible cells according to different criteria. UE 102 may thus prioritize cell measurement and cell reselection to compatible cells over incompatible cells, and as a result may prioritize the maintenance of ongoing active eMBMS sessions over cell measurement and reselection of incompatible cells.

For example, UE 102 may identify nearby candidate cells (i.e. cells available for measurement or reselection) that are compatible and may identify nearby candidate cells that are incompatible if an eMBMS stream is active. This may be performed according to a database created by UE 102 based on past interactions with nearby candidate cells, such as documenting whether or not nearby candidate cells are providing the active eMBMS stream. Alternatively, UE 102 may be provided with a database detailing which cells provide certain eMBMS streams, such as e.g. by receiving the database from the network, and accordingly may determine which nearby candidate cells are providing the active eMBMS strea.

UE 102 may then utilize the network-provided measurement and reselection thresholds to determine whether or not cell measurement or reselection of compatible cells is necessary. For example, UE 102 may compare measured serving cell RSRP and RSRQ to the network-provided thresholds, and may initiate cell measurement or reselection to compatible cells based on the comparison. As the compatible cells are providing the active eMBMS stream, cell measurement and reselection to compatible cells may be unaffected.

However, UE 102 may utilize an alternate set of thresholds to determine whether or not cell measurement or cell reselection to incompatible cells should be initiated. For example, UE 102 may be provided with alternate signal power measurement threshold, alternate signal power reselection threshold, alternate signal quality measurement threshold, and alternate signal quality reselection threshold, which are each be less than the respective network-provided measurement and reselection thresholds.

UE 102 may then compare the measured serving cell RSRP and RSRQ to the alternate measurement and reselection thresholds to determine whether or not to initiate cell measurement or reselection of incompatible cells. As the alternate thresholds are lower than the network-provided thresholds, UE 102 may not initiate cell measurement or reselection of incompatible cells until the measured serving cell RSRP or RSRQ has fallen to even lower levels. Accordingly, UE 102 may continue receiving an active eMBMS stream uninterrupted by cell measurement or reselection to incompatible cells until the measured serving cell RSRP or RSRQ falls below the reduced alternate thresholds.

UE 102 may thus determine whether or not to perform neighbor cell protocol interactions with compatible and incompatible cells according to different sets of threshold criteria. As the alternate thresholds used with incompatible cells are less than the network-provided thresholds used with compatible cells, UE 102 may begin performing cell measurement or reselection of compatible cells before initiating cell measurement or reselection to incompatible cells. UE 102 may therefore prioritize reception of an active eMBMS session over cell measurement and reselection of incompatible cells, which may negatively affect the active eMBMS session.

This approach may be particularly advantageous in the above-detailed scenario in which UE 102 is in idle mode and receiving an eMBMS stream from serving eNB 104 and is moving outside of the service area of serving eNB 104. As UE 102 is in idle mode, UE 102 may perform serving cell RSRP and RSRQ measurements, and may compare the measured serving cell RSRP and RSRQ to thresholds in order to determine whether or not to initiate cell measurement and reselection to nearby candidate cells. UE 102 may compare the measured serving cell RSRP and RSRQ to both network-provided and alternate thresholds in order to determine whether cell measurement and reselection to compatible and incompatible cells should be performed.

As UE 102 moves out of the service area of eNB 104, the serving cell RSRP and RSRQ measurements may fall below the network-provided measurement thresholds but still remain above the alternate measurement thresholds. UE 102 may then initiate cell measurement of nearby compatible cells, which may be identified according to a database of nearby candidate cells that are providing the active eMBMS stream. UE 102 may however not initiate measurement of nearby incompatible cells, as the measured serving cell RSRP and RSRQ exceed the alternate measurement thresholds. UE 102 may thus only perform cell measurement of compatible cells, and may not perform cell measurement of incompatible cells. UE 102 may thus restrict the required cell measurements to only compatible cells, and accordingly may experience a reduced drop in eMBMS reception quality as cell measurements of incompatible cells are avoided. Additionally, cell measurements of incompatible cells may be seen as undesirable, as a subsequent reselection to any such incompatible cell (e.g. based on the neighbor cell measurement) would terminate the active eMBMS session.

As UE 102 moves farther from eNB 104, the measured serving cell RSRP and RSRQ may continue to fall, and may eventually fall below the alternate measurement threshold. UE 102 may subsequently begin performing cell measurements of incompatible cells, which may be necessary as the radio link with serving eNB 104 continues to fall. For example, if the radio link with serving eNB 104 falls to significantly low levels, UE 102 may no longer be able to receive paging messages from serving eNB 104. In order to avoid such a loss of paging channel, UE 102 may need to prepare for potential reselection to a nearby candidate cell, and accordingly UE 102 may need to perform cell measurements on nearby candidate cells for use in a potential reselection. UE 102 may thus initiate cell measurements on incompatible cells if the measured serving cell RSRP or RSRQ fall below the alternate measurement thresholds. As the measured serving cell RSRP and RSRQ remain below the network-provided measurement threshold, UE 102 may continue to perform cell measurements on compatible cells.

The measured serving cell RSRP or RSRQ may eventually fall below the network-provided reselection threshold but remain above the alternate reselection threshold, and UE 102 may thus attempt reselection to a suitable compatible cell. As the measured serving cell RSRP or RSRQ remains above the alternate reselection threshold, UE 102 may not consider incompatible cells for reselection, although UE 102 may continue to perform cell measurements on incompatible cells. UE 102 may thus only attempt reselection to compatible cells, which would allow UE 102 to continue the active eMBMS session on the nearby compatible cell. UE 102 may not consider incompatible cells for reselection at this point, as reselection to an incompatible cell would terminate the active eMBMS session.

If no compatible cell is found for reselection, the measured serving cell RSRP or RSRQ may eventually fall below the alternate reselection thresholds. As UE 102 may be in danger of losing an active paging channel, UE 102 may accordingly consider incompatible cells for reselection. While reselection to an incompatible cell would terminate the active eMBMS session, reselection may be necessary in order to maintain an active paging channel with the network.

UE 102 may thus avoid performing cell measurement and reselection to incompatible cells for extended periods of time, thereby allowing a user to maintain a substantially uninterrupted eMBMS session. A user moving out of the eMBMS service area may thus enjoy an active eMBMS session for a longer period of time before cell measurement and reselection to incompatible cells becomes absolutely necessary.

The quality of an active eMBMS session may also be considered in the decision to consider incompatible cells for measurement and reselection. For example, a UE may determine the quality of an active eMBMS session by analyzing eMBMS stream quality indicators such as e.g. a block error rate and/or video/audio decoder quality. The UE may then continue to prioritize cell measurements and reselection on compatible cells over incompatible cells (e.g. by using reduced alternate thresholds to trigger cell measurements and reselection on incompatible cells) for as long as the measured eMBMS stream quality indicator remains above an eMBMS stream quality indicator threshold. If the measured eMBMS stream quality indicator falls below the eMBMS stream quality indicator threshold, the UE may determine that the eMBMS stream quality is substantially poor, and accordingly prioritization of the eMBMS stream is no longer necessary. The UE may then proceed as if no eMBMS stream is active, and may use the network-provided thresholds to initiate cell measurement and reselection of both compatible and incompatible cells.

Figure 2:
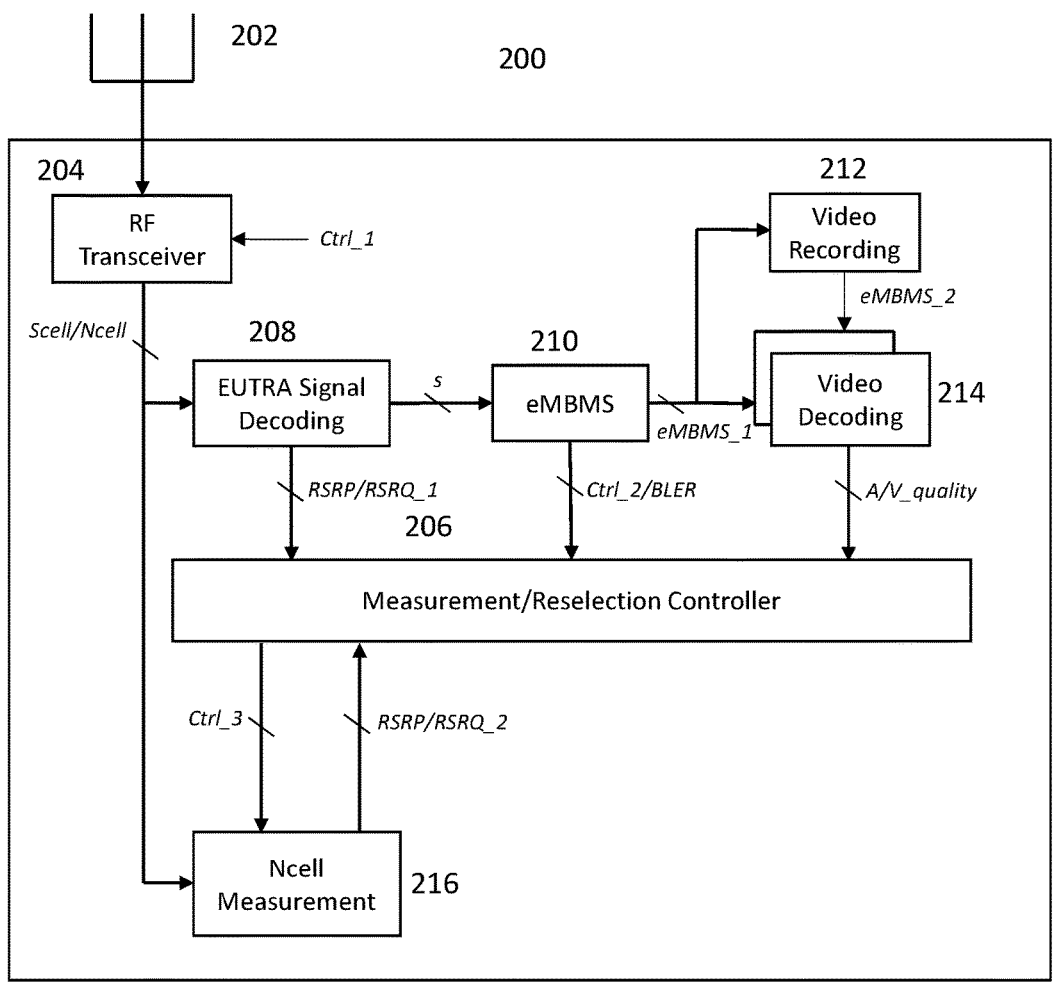
FIG. 2 shows various components and circuits of the UE of FIG. 1.

FIG. 2 shows various components and circuits of a UE 200 configured to perform cell measurements and cell reselection according to the eMBMS capabilities of nearby candidate cells. As will be described, UE 200 may be configured to consider the whether or not nearby measurement and reselection candidate cells are providing an active eMBMS stream as a criteria in initiating neighbor cell measurements and cell reselection.

As shown in FIG. 2, UE 200 may be provided with antenna 202, RF transceiver 204, measurement/reselection control circuit 206, EUTRA signal decoding circuit 208, eMBMS processing circuit 210, video recording circuit 212, video decoding circuit 214, and neighbor cell measurement circuit 216. The aforementioned circuits may be implemented as separate circuits, e.g. as separate integrated circuits. However, some or all of the circuits (e.g. measurement/reselection control circuit 206, EUTRA signal decoding circuit 208, eMBMS processing circuit 210, video recording circuit 212, video decoding circuit 214, and/or neighbor cell measurement circuit 216) may be implemented by a single common programmable processor, such as e.g. a microprocessor. Although not explicitly shown, UE 200 may additionally be configured to include a variety of other components and circuits based on desired capabilities of UE 200, such as e.g. processors, memory, user input and output devices, other specialty hardware/processors/circuits, etc. As previously stated, while the exemplary descriptions refer are directed towards eMBMS, it is understood that the detailed configurations and procedures are considered similarly applicable to MBMS and various other multicast/broadcast services.

UE 200 may be provided with antenna 202, which may receive wireless radio signals such as e.g. from eNBs 104 and 106 over respective air interfaces 110 and 112. Antenna 202 may be composed of a single antenna or alternatively may be an antenna array composed of a plurality of antennas.

Antenna 202 may provide received wireless radio signals to RF transceiver 204 as electrical radio signals. RF transceiver 204 may be configured to demodulate and digitize radio signals received from antenna 202, such as e.g. by selecting a desired carrier frequency and performing analog to digital conversion of received radio signals. RF transceiver 204 may also be configured to perform radio transmissions using antenna 202, such as e.g. by receiving signals intended for uplink transmission from other components of UE 200, modulating the received uplink transmission signals onto a radio frequency carrier signal, and transmitting a resulting analog radio frequency signal using antenna 202. RF transceiver may be controlled by control signal Ctrl_1, which may be provided by a controlling circuit such as measurement/reselection control circuit 206, neighbor cell measurement circuit 216, and/or other circuits and components of UE 200 that may require the reception of radio signals on certain carrier frequencies and/or radio access technologies. Control signal Ctrl_1 may dictate the signals received by RF transceiver 204 as well as any signals transmitted by RF transceiver 204. UE 200 may be configured to perform neighbor cell measurements and neighbor cell reselection based on the status of eMBMS sessions, serving cell signal measurements, and the capabilities of nearby neighbor cells. For example, UE 200 may be located similarly to UE 102 as shown in FIG. 1B, and may be located on the outer edge of coverage area 120 of eNB 104. UE 200 may additionally be entering coverage area 122 of eNB 106. UE 200 may be additionally be in idle mode, and may currently be utilizing eNB 104 as the serving eNB (i.e. UE 200 may be camping on eNB 104). UE 200 may additionally be receiving an active eMBMS stream from eNB 104, i.e. UE 200 may have an active eMBMS session with eNB 104. Accordingly, UE 200 and serving eNB 104 may be eMBMS-capable.

UE 200 may be configured to periodically measure the signal power and signal quality of serving eNB 104, such as by measuring the signal power and signal quality of reference signals transmitted by eNB 104. RF transceiver 204 may select the appropriate carrier frequency to receive radio signals from serving eNB 104 (e.g. as provided by control signal Ctrl_1), and may provide the signal received from serving eNB 104 to EUTRA signal decoding circuit 208 after the received radio signal has been demodulated to baseband or intermediate frequencies and digitized.

EUTRA signal decoding circuit 208 may decode the received signal provided by RF transceiver 204. EUTRA signal decoding circuit 208 may then measure the RSRP and RSRQ of the received signal from eNB 104. Accordingly, the received signal may be a reference signal, such as a cell-specific reference signal, which is transmitted periodically from serving eNB 104. The resulting RSRP and RSRQ measurements may accordingly represent the signal power and signal quality of the signal received from serving eNB 104.

As shown in FIG. 2, EUTRA signal decoding circuit 208 may provide the measured RSRP and RSRQ values to measurement/reselection control circuit 206 over RSRP/RSRQ_1 control line. Measurement/reselection controller circuit 206 may be configured to control whether neighbor cell measurements and cell reselection should be initiated based on the measured RSRP and RSRQ values received over RSRP/RSRQ_1 control line. For example, measurement/reselection control circuit 206 may compare the measured RSRP and RSRQ values to one or more thresholds, and determine whether neighbor cell measurements and/or cell reselection is necessary based on the measured RSRP and RSRQ values. Based on the measurement/reselection decision, measurement/reselection control circuit 206 may then control neighbor cell measurement circuit 216 to perform neighbor cell measurements, such as e.g. RSRP and/or RSRQ measurements of neighbor cells. Neighbor cell measurement circuit 216 may then provide measured neighbor cell RSRP/RSRQ values to measurement/reselection control circuit 206 over RSRP/RSRQ_2 control line, which measurement/reselection control circuit 206 may then utilize for further measurement/reselection purposes, such as selecting an appropriate neighbor cell for reselection.

As previously detailed, conventional 3GPP standards utilize network-provided measurement and reselection thresholds. For example, base stations may broadcast measurement and reselection thresholds (i.e. network-provided measurement and reselection thresholds) for mobile terminals to utilize in order to make decisions regarding the triggering of neighbor cell measurements and/or reselection. Mobile terminals may receive the measurement and reselection thresholds and compare serving cell signal power/signal quality measurements to the thresholds in order to determine whether or not neighbor cell measurement and/or reselection is necessary. The network-provided measurement threshold is typically less than the reselection threshold, and accordingly a mobile terminal will begin performing neighbor cell measurements if the serving cell signal power/signal quality falls below the network-provided measurement threshold. If the serving cell signal power/signal quality falls below the network-provided reselection threshold, the mobile terminal may perform reselection to an appropriate neighbor cell based on the neighbor cell measurements. The network may provide measurement and reselection thresholds for both serving cell signal power and serving cell signal quality, and accordingly there may be a network-provided signal power measurement threshold, a network-provided signal quality measurement threshold, a network-provided signal power reselection threshold, and a network-provided signal quality reselection threshold. The mobile terminal may then trigger neighbor cell measurements and/or cell reselection based on whether one or both of the signal power and signal quality falls below the respective network-provided thresholds.

As opposed to the conventional network standards, measurement/reselection controller circuit 206 may be configured to consider an additional set of thresholds in determining whether to perform cell measurements and/or reselection with incompatible cells. For example, neighbor cell measurement circuit 216 may utilize the aforementioned network-provided signal power and signal quality measurement and reselection thresholds in addition to an alternate signal power measurement threshold, an alternate signal quality measurement threshold, an alternate signal power reselection threshold, and an alternate signal quality reselection threshold. Measurement/reselection control circuit 206 may utilize the alternate set of thresholds to evaluate neighbor cells that do not support an active eMBMS stream, i.e. are incompatible.

In an exemplary aspect of the disclosure, UE 200 may determine whether or not an active eMBMS session is enabled with serving eNB 104. If no active eMBMS session is enabled, UE 200 may perform neighbor cell measurements and/or cell reselection for all nearby candidate cells according to criteria provided by the network. For example, UE 200 may be idle mode, and may thus be configured to trigger neighbor cell measurements if the signal power or signal quality associated with serving eNB 104 falls below a network-defined measurement threshold. UE 200 may additionally determine whether the signal power or signal quality associated with serving eNB 104 falls below a network-defined reselection threshold, and may proceed to perform cell reselection if the signal power and/or signal quality is less than the network defined reselection threshold. For example, measurement/reselection controller 206 may compare the RSRP/RSRQ measurements received from EUTRA signal decoding circuit 208 with RSRP and RSRQ thresholds provided by the network, such as e.g. received from eNB 104 as control information. If the measured RSRP falls below a network-provided signal power measurement threshold and the measured RSRQ falls below a network-provided signal quality measurement threshold, measurement/reselection control circuit 206 may trigger neighbor cell measurements for all nearby candidate cells, such as by providing control to neighbor cell measurement circuit 216 to initiate neighbor cell measurements. Alternatively, if the measured RSRP falls below a network-provided signal power reselection threshold and the measured RSRQ falls below a network-provided signal quality reselection threshold, measurement/reselection control circuit 206 may initiate cell reselection procedures. The network-provided signal power reselection threshold and the network-provided signal quality reselection threshold may be lower than the network-provided signal power measurement threshold and the network-provided signal quality measurement threshold, respectively, in order to ensure that UE 200 performs neighbor cell measurements prior to initiating cell reselection. Accordingly, as no eMBMS session is active UE 200 may proceed according to the network standard using the network-provided criteria without considering the capabilities of nearby neighbor cells. UE 200 may thus consider all nearby candidate cells for measurement or reselection, regardless of the eMBMS capabilities of the nearby candidate cells.

However, if an active eMBMS session is enabled with serving eNB 104, UE 200 may additionally consider the capabilities of nearby neighbor cells along with an alternate set of thresholds for determining whether to initiate neighbor cell measurements and/or cell reselection. For example, UE 200 may currently be receiving an eMBMS stream from eNB 104. UE 200 may then prioritize neighbor cell measurements and/or cell reselection to neighbor cells that offer the same eMBMS stream (i.e. compatible cells) over neighbor cells that do not offer the same eMBMS stream (i.e. incompatible cells). UE 200 may as a result avoid initiating cell measurement and reselection of incompatible cells until necessary, thereby preserving the quality of the active eMBMS stream.

UE 200 may identify nearby candidate cell for measurement or reselection that are compatible or incompatible, such as e.g. according to a database that indicates which cells provide specific eMBMS streams. UE 200 may then determine which cells to initiate cell measurements or cell reselection with based on which nearby candidate cells are compatible or incompatible.

For example, UE 200 may additionally have a set of alternate thresholds for use in initiating neighbor cell measurements and/or cell reselection with incompatible cells when an eMBMS session is active. UE 200 may have e.g. an alternate signal power measurement threshold, an alternate signal quality measurement threshold, an alternate signal power reselection threshold, and an alternate signal quality reselection threshold. Measurement/reselection control circuit 206 may be configured to compare the measured RSRP/RSRQ provided by EUTRA signal decoding circuit 208 to the alternate thresholds if an eMBMS session is active.

UE 200 may then utilize either the network-provided measurement and reselection thresholds or the alternate measurement and reselection thresholds to trigger measurement and/or reselection based on whether or not an eMBMS stream is active and whether or not nearby neighbor cells are compatible or incompatible. Measurement/reselection control circuit 206 may thus receive the RSRP/RSRQ measurements of the serving cell from EUTRA signal decoding circuit 208 over RSRP/RSRQ_1 control line, and may compare the serving cell RSRP/RSRQ measurements to the network-provided and alternate thresholds based on whether or not an eMBMS session is active.

eMBMS processing circuit 210 may be configured to determine whether or not an eMBMS stream is active. EUTRA signal decoding circuit 208 may decode the received signal and provide mobile communication signal s to eMBMS processing circuit 210. eMBMS processing circuit 210 may then extract eMBMS data from mobile communication signal s. It is noted that, although not explicitly shown, various additional components of UE 200 may process mobile communication signal s, such as e.g. to obtain included voice and/or data information.

eMBMS processing circuit 210 may then process mobile communication signal s, such as e.g. to determine if an eMBMS data stream is contained in mobile communication signal s and to perform error correction of any contained eMBMS data stream. eMBMS processing circuit 210 may be configured to determine whether or not an active eMBMS session is ongoing, e.g. whether eMBMS data is currently being received by UE 200. eMBMS processing circuit 210 may perform this determination based on e.g. the detection of eMBMS data in mobile communication signal s and/or on past knowledge of ongoing eMBMS sessions. eMBMS processing circuit 210 may identify a specific eMBMS stream, such as e.g. video data associated with a particular event, that is contained in mobile communication signal s. eMBMS processing circuit 210 may then be configured to provide measurement/reselection control circuit 206 with eMBMS control information (e.g. whether eMBMS is active and identification information of any active eMBMS streams) as control signal Ctrl 2, as shown in FIG. 2.

Measurement/reselection control circuit 206 may then decide whether or not to perform neighbor cell measurements and/or reselection based on any active eMBMS streams (as indicated in control signal Ctrl 2) and the received serving cell RSRP/RSRQ information (as indicated in control signal RSRP/RSRQ_1). If an eMBMS stream is active, measurement/reselection control circuit 206 may determine whether or not to perform neighbor cell measurements and/or reselection and which cells to perform neighbor cell measurements and/or reselection with by comparing the serving cell RSRP/RSRQ information to both the network-provided and alternate measurement and reselection thresholds. If no eMBMS stream is active, measurement/reselection control circuit 206 may perform neighbor cell measurements and/or reselection and which cells to perform neighbor cell measurements and/or reselection with based only on the network-provided thresholds. In other words, measurement/reselection control circuit 206 may perform neighbor cell measurements and/or reselection based on the standard configuration if no eMBMS session is active, and accordingly may not consider whether or not nearby candidate cells are compatible or incompatible.

If an eMBMS session is active, measurement/reselection control circuit 206 may utilize the network-provided and alternate thresholds to determine which cells, if any, cell measurements and/or reselection should be performed for. Specifically, UE 200 may determine whether or not to perform neighbor cell measurements and/or reselection based on whether or not certain neighbor cells are capable of supporting the active eMBMS stream. As previously detailed, eMBMS processing circuit 210 may determine whether an active eMBMS stream is present in mobile communication signal s, and may identify a unique eMBMS stream. As previously detailed, unique eMBMS streams may only be broadcasted over specific geographic areas and at specific times, and accordingly not all eMBMS-enabled cells may broadcast the same eMBMS stream. Accordingly, eMBMS processing circuit 210 may identify an eMBMS stream actively being received from the serving cell at eNB 104, and may provide this information to measurement/reselection control circuit 206 with control signal Ctrl 2.

Measurement/reselection control circuit 206 may thus identify an active eMBMS stream being received from eNB 104. Accordingly, a user viewing the eMBMS stream may wish to continue receiving the eMBMS stream at a high quality. However, the user may move out of the coverage area of eNB 104, and UE 102 may need to perform cell reselection to a new serving cell. However, it is possible that nearby candidate cells are not providing the same active eMBMS stream (i.e. incompatible cells), and therefore performing cell reselection to one of these incompatible cells will result in termination of the active eMBMS stream. Additionally, UE 200 may trigger measurement gaps upon determining that the received signal from eNB 104 is deteriorating, which may reduce the quality of the active eMBMS stream due to the temporary lapses in reception needed to perform measurement gaps. A user may thus wish to prioritize cell reselection and cell measurements to neighbor cells that offer the same eMBMS stream, i.e. are compatible cells. Additionally, if no neighbor cells are available to perform measurements and/or reselection therewith, a user may wish to postpone the initiation of measurements and/or reselection until absolutely necessary. A user may thus wish to wait until the received signal from the serving cell becomes substantially low before initiating neighbor cell measurements and/or reselection to incompatible cells.

Accordingly, UE 200 may prioritize neighbor cell measurements and/or reselection based on which neighbor cells are providing the same eMBMS stream. As previously detailed, UE 200 may identify which of the nearby candidate cells are compatible (providing the same eMBMS stream) and which of the nearby candidate cells are incompatible (not providing the same eMBMS stream). For example, UE 200 may document which cells are providing the active eMBMS stream based on past interactions to create a database of compatible and incompatible cells. UE 200 may also receive a database, such as e.g. from a base station, that details which cells are providing specific eMBMS streams. For example, the provider of an eMBMS stream may provide a database listing which cells are providing the eMBMS stream, which may then be transmitted by one or more base stations to UEs as control information. UE 200 may then determine which cells are compatible and which cells are incompatible.

UE 200 may thus store an eMBMS database that details which cells are broadcasting one or more eMBMS streams, e.g. in measurement/reselection control circuit 206. UE 200 may therefore have prior information detailing which neighbor cells are providing a specific eMBMS stream, and may thus determine which neighbor cells are compatible cells. Measurement/reselection control circuit 206 may then utilize the eMBMS database to prioritize measurements and/or reselection of compatible cells over incompatible cells.

UE 200 may prioritize measurements and/or reselection of compatible cells over incompatible cells by only initiating neighbor cell measurement and/or reselection of incompatible cells if the measured serving cell levels fall below alternate thresholds, which may be lower than the network-provided thresholds. For example, measurement/reselection control circuit 206 may trigger neighbor cell measurements for compatible cells (e.g. by controlling neighbor cell measurement circuit 216 to perform measurements of compatible cells) once the measured serving cell RSRP/RSRQ falls below the network-provided signal power/signal quality measurement threshold if an eMBMS stream is active. Measurement/reselection control circuit 206 may then trigger neighbor cell measurements for incompatible cells if the serving cell RSRP/RSRQ falls below the alternate signal power/signal quality measurement threshold, which may be lower than the network-provided signal power/signal quality measurement threshold. Accordingly, UE 200 may delay neighbor cell measurements of incompatible cells until necessary, thereby preserving the quality of an active eMBMS stream for as long as possible. The alternate signal power/signal quality measurement threshold may be selected in order to indicate that the received signal from the serving eNB has degraded to unacceptable levels, such as e.g. where paging messages may no longer be received. The alternate signal power/signal quality reselection thresholds may be similarly utilized, and may be less than the network-provided signal power/signal quality reselection threshold. Accordingly, UE 200 may need to begin neighbor cell measurements/reselection when the serving cell RSRP/RSRQ values fall below the alternate thresholds in order to avoid losing the connection with the serving eNB. UE 200 may thus delay performing cell measurements and/or reselection on incompatible cells for as long as necessary until the serving cell RSRP/RSRQ values fall below the alternate thresholds.

Figure 3A:
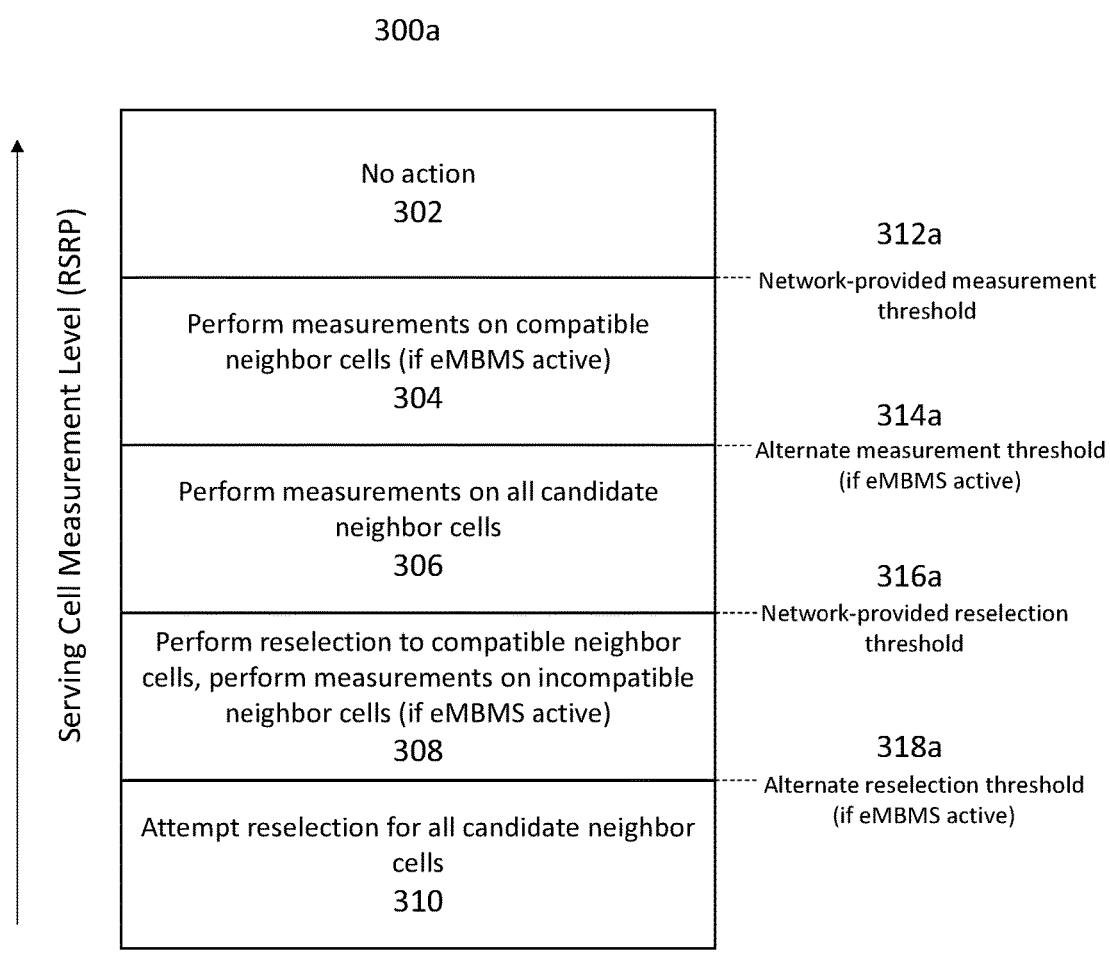
FIG. 3A shows a decision chart illustrating a neighbor cell measurement/cell reselection process according to an exemplary aspect of the disclosure.

FIG. 3A shows decision chart 300a, which details an exemplary decision making process of measurement/reselection control circuit 206 of UE 200 based on serving cell RSRP. Decision chart 300a additionally assumes that UE 200 is actively receiving an eMBMS stream.

As previously detailed, measurement/reselection control circuit 206 may receive a serving cell RSRP, and may compare the serving cell RSRP to one or more signal power thresholds in order to determine whether or not to perform cell measurements and/or reselection, and which cells to perform cell measurements and/or reselection on. Decision chart 300a details an exemplary implementation in which measurement/reselection control circuit 206 is configured to trigger cell measurements and/or reselection based on the level of serving cell RSRP compared with several thresholds. Measurement/reselection control circuit 206 may then perform one of actions 302-310 based on the level of the measured serving cell RSRP compared to thresholds 312a-318a.

Measurement/reselection control circuit 206 may be provided with network-provided signal power measurement threshold 312a, alternate signal power measurement threshold 314a, network-provided signal power reselection threshold 316a, and alternate signal power reselection threshold 318a. As shown in FIG. 3A, network-provided signal power measurement threshold 312a may the highest signal power threshold, followed by alternate signal power measurement threshold 314a and network-provided signal power reselection threshold 316a. Alternate reselection threshold 318a may be the lowest signal power threshold.

If no eMBMS session is active, measurement/reselection control circuit 206 may compare the measured serving cell RSRP to network-provided measurement threshold 312a and network-provided reselection threshold 316a in order to determine if action 302, action 306, or action 310 is necessary. As detailed in FIG. 3A, actions 302, 306, and 310 may dictate a cell measurements or reselection action for all candidate cells, and accordingly may not consider whether or not the candidate cells are compatible or incompatible. Measurement/reselection control circuit 206 may thus not consider whether nearby cells are compatible or incompatible, as no eMBMS session is active. For example, if the measured serving cell RSRP exceeds network-provided measurement threshold 312a, measurement/reselection control circuit 206 may decide not to initiate cell measurements or reselection on any cell. If the measured serving cell RSRP falls below network-provided measurement threshold 312a and exceeds network-provided reselection threshold 316a, measurement/reselection control circuit 206 may control neighbor cell measurement circuit 216 to perform measurements on all candidate neighbor cells (action 306). Similarly if the measured serving cell RSRP falls below network-provided reselection threshold 316a, measurement/reselection control circuit 206 attempt reselection to any suitable candidate neighbor cells (action 310). Measurement/reselection control circuit 206 may thus not utilize actions 304b or 308b in addition to alternate measurement threshold 314b or alternate reselection threshold 318b if no eMBMS session is active.

If an eMBMS session is active, measurement/reselection control circuit 206 may then compare the measured RSRP to each of signal power thresholds 312a-318a to determine which cells, if any, measurement and/or reselection should be performed on. If the measured RSRP is above network-provided measurement threshold 312a, no action (action 302) is taken by measurement/reselection control circuit 206, as the received signal power is at an acceptable level. However, if the measured RSRP falls below network-provided measurement threshold 312a, measurement/reselection control circuit 206 may decide to perform either cell measurements or reselection depending on the measured RSRP level.

For example, if the measured RSRP is between network-provided measurement threshold 312a and alternate measurement threshold 314a, measurement/reselection control circuit 206 may decide to perform measurements on neighbor cells (action 304) that provide the same active eMBMS stream that UE 200 is receiving (i.e. compatible cells). Measurement/reselection control circuit 206 may decide not to perform measurements on neighbor cells that do not provide the same active eMBMS stream (i.e. incompatible cells), as these measurements may negatively affect the active eMBMS stream.

As previously detailed, measurement/reselection control circuit 206 may be provided with an eMBMS database that details which neighbor cells are providing specific eMBMS streams, and thus may identify which neighbor cells are compatible or incompatible. Measurement/reselection control circuit 206 may thus determine whether cell measurements and/or reselection should be performed on compatible and/or incompatible cells. Measurement/reselection control circuit 206 may then provide neighbor cell measurement circuit 216 with control signal Ctrl_3 indicating which cells should be measured. Neighbor cell measurement circuit 216 may then perform neighbor cell measurements as specified by measurement/reselection control circuit 206. For example, neighbor cell measurement circuit 216 may control RF transceiver via control signal Ctrl_1 to receive a certain carrier frequency corresponding to a specific neighbor cell targeted for measurement. RF transceiver 204 may then receive wireless signals at the certain carrier frequency using antenna 202 and provide resulting electrical signals to neighbor cell measurement circuit 216. Neighbor cell measurement circuit 216 may then perform neighbor cell measurements, such as e.g. measuring RSRP and/or RSRQ, and provide the resulting measurements to measurement/reselection control circuit 206, where the measured RSRP and/or RSRQ values may be processed.

If the measured RSRP falls below alternate measurement threshold 314a and above network-provided reselection threshold 316a, measurement/reselection control circuit 206 may decide that measurements on incompatible neighbor cells are also appropriate, as the serving cell RSRP has degraded to low levels. Measurement/reselection control circuit 206 may then perform measurements on all candidate neighbor cells (action 306), i.e. both compatible and incompatible cells. While the performance of measurements on all candidate cells may deteriorate the quality of a received eMBMS stream, it may be necessary in order to prevent the received signal from the serving cell from dropping to unacceptable levels by preparing for a possible cell reselection.

If the measured serving cell RSRP falls below network-provided reselection threshold 316a but is above alternate reselection threshold 318a, measurement/reselection control circuit 206 may decide to attempt reselection to all compatible neighbor cells (action 308). Measurement/reselection control circuit 206 may then determine which cells are compatible, such as e.g. by accessing an eMBMS database that details which cells are providing specific eMBMS streams. Measurement/reselection control circuit 206 may then attempt to initiate reselection on the compatible cells, which may be performed according to the network standard based on serving cell measurements and measurements of the candidate neighbor cell. As the measured serving cell RSRP is still above alternate reselection threshold 318a, measurement/reselection control circuit 206 may not initiate reselection on any incompatible cells, as such a reselection would terminate the active eMBMS stream. UE 200 may thus delay reselection to an incompatible cell, thereby maintaining reception of the active eMBMS stream for as long as possible.

However, measurement/reselection control circuit 206 may still control neighbor cell measurement circuit 216 to perform measurements on incompatible neighbor cells, as the measured serving cell RSRP is below alternate measurement threshold 314a. Measurement/reselection control circuit 206 may thus attempt reselection to compatible cells in addition to performing cell measurements on incompatible neighbor cells (action 308) if the measured serving cell RSRP falls between network-provided reselection threshold 316a and alternate reselection threshold 318a.

If the measured serving cell RSRP falls below alternate reselection threshold 318a, measurement/reselection control circuit 206 may then initiate reselection to incompatible cells in addition to compatible cells (action 310). Measurement/reselection control circuit 206 may interpret the measured serving cell RSRP falling below alternate reselection threshold 318a as an indication that the received signal from the serving cell is approaching unacceptably low levels, and important information such as e.g. paging messages may not be successfully received. Measurement/reselection control circuit 206 may thus determine that an active eMBMS session must be terminated in order to maintain an active connection with the network, such as by performing reselection to an incompatible cell. As reselection to compatible cells may have already been attempted in 308a, reselection to compatible cells has been prioritized over reselection to incompatible cells, and accordingly it is possible that measurement/reselection control circuit 206 may identify an acceptable compatible cell before the measured serving cell RSRP falls below alternate reselection threshold 318a. An active eMBMS session may thus be maintained on the compatible cell.

Alternatively, the alternate measurement thresholds 314a and 314b may be lower than the network-provided reselection thresholds 316a and 316b. In this exemplary approach, a UE may be configured to attempt reselection on compatible cells before initiating cell measurement on incompatible cells. This may further prioritize cell measurement and reselection of compatible cells over incompatible cells, and may allow a UE to delay initiation of cell measurement of incompatible cells for even longer periods of time.

As previously detailed, decision chart 300a may be beneficial when a user is leaving the overall eMBMS coverage area, i.e. leaving the coverage area of compatible cells that are providing the same active eMBMS stream. The user may thus wish to maintain the eMBMS stream for as long as possible before reselection to an incompatible cell, and accordingly the associated thresholds for reselection may be lowered from the network-provided reselection threshold to the alternate reselection threshold. Similarly, the associated measurement threshold may be lowered from the network-provided measurement threshold to the alternate measurement threshold, thereby preserving the quality of the active eMBMS stream by avoiding lapses in eMBMS reception caused by measurement gaps. The alternate thresholds may only be used for incompatible cells, as compatible cells may allow for a user to continue reception of the same active eMBMS stream. Measurements and reselection of compatible cells are thus beneficial, as they offer potential for prolonged eMBMS reception.

The decision process detailed in decision chart 300a may executed by measurement/reselection control circuit 206 as a continuous process. For example, measurement/reselection control circuit 206 may continuously compare the measured serving cell RSRP to thresholds 312a-318a in order to determine an appropriate action of actions 302-310. EUTRA signal decoding circuit 208 may continuously provide measurement/reselection control circuit 206 with measured serving RSRP values, which may be continuously analyzed by measurement/reselection control circuit 206 with regard to the appropriate thresholds. Similarly, eMBMS processing circuit 210 may continuously provide measurement/reselection control circuit 206 with active eMBMS stream information, and accordingly measurement/reselection control circuit 206 may be able to identify which of the alternate or network-provided thresholds are appropriate based on if an eMBMS stream is active.

If no eMBMS session is active, measurement/reselection control circuit 206 may periodically compare the measured RSRP value to network-provided measurement threshold 312a and network-provided reselection threshold 316a in order to determine whether either neighbor cell measurements and/or cell reselection is necessary. As no eMBMS session is active, measurement/reselection control circuit 206 may not consider whether neighbor cells are compatible or incompatible, and may perform measurements or reselection on all candidate cells if the measured serving cell RSRP value falls below network-provided measurement threshold 312a or network-provided reselection threshold 316a, respectively. Measurement/reselection control circuit 206 may continuously perform the corresponding comparison between the measured serving cell RSRP and the network-provided thresholds to determine which of actions 302-310 are necessary based on the most recent measured serving cell RSRP.

If an eMBMS session is active, measurement/reselection control circuit 206 may similarly perform periodic comparisons between the measured serving cell RSRP and the alternate and network-provided thresholds in order to determine whether measurements and/or reselection should be performed for compatible and/or incompatible cells. Accordingly, measurement/reselection control circuit 206 may determine an appropriate action out of actions 302-310 based on the level of the measured serving cell RSRP in relation to threshold 312a-318a.

Figure 3B:
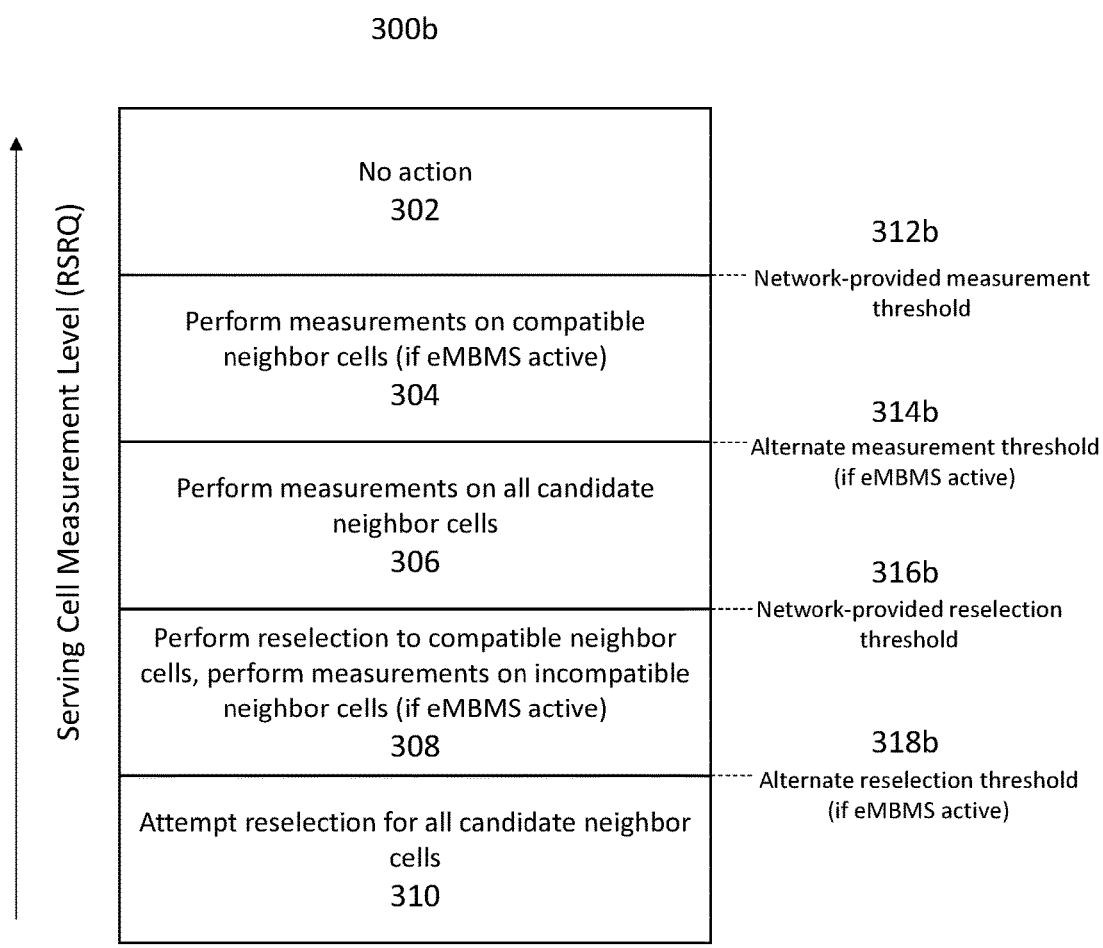
FIG. 3B shows a decision chart illustrating a neighbor cell measurement/cell reselection process according to another exemplary aspect of the disclosure.

FIG. 3B shows decision chart 300b, which details a similar process for selecting appropriate cells for measurement and/or reselection based on RSRQ. As previously detailed, EUTRA signal decoding circuit 208 may provide measurement/reselection control circuit 206 with the measured serving cell RSRQ. eMBMS processing circuit 210 may provide measurement/reselection control circuit 206 with information identifying any active eMBMS streams. Measurement/reselection control circuit 206 may be configured to utilize this information in order to select an appropriate action of actions 302-310 to perform.

Similarly to decision chart 300a, measurement/reselection control circuit 206 operating according to decision chart 300b may compare the measured serving cell RSRQ to network provided measurement threshold 312b and network-provided reselection threshold 316b if no eMBMS session is active. Measurement/reselection control circuit 206 may then determine whether to perform action 302, action 308, or action 310 based on whether the measured serving cell falls above, below, or in between network-provided measurement threshold 312b and network-provided reselection threshold 316b.

If an eMBMS session is active, measurement/reselection control circuit 206 may identify which nearby cells are compatible and incompatible based on the identity of the active eMBMS stream and an eMBMS database. Measurement/reselection control circuit 206 may then compare the measured serving cell RSRQ to each of network-provided measurement threshold 312b, alternate measurement threshold 314b, network-provided reselection threshold 316b, and alternate reselection threshold 318b. Measurement/reselection control circuit 206 may then select the corresponding action of actions 302-310 based on the threshold comparison.

UE 200 may utilize decision chart 300a or 300b in isolation, i.e. consider only one of serving cell signal power or serving cell signal quality in order to determine whether to perform cell measurements and/or reselection on compatible and/or incompatible cells. Alternatively, UE 200 may utilize both signal power and signal quality in combination. For example, UE 200 may if either the measured serving cell RSRP or measured serving cell RSRQ falls below one of respective thresholds 312a-318a or 312b-318b. Measurement/reselection control circuit 206 may then select one of actions 302-310 based on the comparison. In an exemplary aspect of the disclosure, measurement/reselection control circuit 206 may select one of actions 302-310 if the measured serving cell RSRP and measured serving cell RSRQ both fall between the signal power and signal quality thresholds with the action. In an exemplary aspect of the disclosure, if the measured serving cell RSRP and measured serving cell RSRQ fall between thresholds associated with different actions, measurement/reselection control circuit 206 may select to perform the action listed lowest on decision chart 300a and 300b. For example, if the measured serving cell RSRP falls between alternate measurement threshold 314a (assuming eMBMS is active) and network provided reselection threshold 316a (i.e. corresponding to action 306), and the measured serving cell RSRQ falls between network-provided reselection threshold 316b and alternate reselection threshold 318b (i.e. corresponding to action 308), measurement/reselection control circuit 206 may select action 308, i.e. to perform reselection to compatible neighbor cells and to perform measurements on incompatible neighbor cells. In an alternative exemplary aspect of the disclosure, measurement/reselection control circuit 206 may be configured to select the highest action listed on decision chart 300a and 300b. In other words, measurement/reselection control circuit 206 may select action 306 in the above-detailed scenario. In a further exemplary aspect of the disclosure, measurement/reselection control circuit 206 may be configured to select the "middle" action if the measured serving cell RSRP and measured serving cell RSRQ falls correspond to actions that are not directly next to one another. In other words, measurement/reselection control circuit 206 may select action 306 if the measured serving cell RSRP corresponds to action 308 and the measured serving cell RSRQ corresponds to action 306.

Accordingly, measurement/reselection control circuit 206 may consider both the measured serving cell signal power and the measured serving cell signal quality in determining whether to perform cell measurements and/or reselection on compatible and/or incompatible cells. Additionally, measurement/reselection control circuit 206 may be configured to utilize either only the network-provided measurement and reselection thresholds (i.e. if no eMBMS session is active), or to use the network-provided measurement and reselection thresholds in combination with lower, alternate measurement reselection thresholds (i.e. if an eMBMS stream is active). As the alternate thresholds are lower than the network-provided thresholds, UE 200 may only perform measurements or reselection of incompatible cells if the serving cell RSRP or RSRQ drops to unacceptably low levels. UE 200 may thus maintain an uninterrupted eMBMS stream without degradation in reception due to measurement gaps of incompatible cells or stream termination due to reselection to an incompatible cell. The network-provided thresholds may still be used to dictate the actions of UE 200 for compatible cells, and accordingly cell measurements and reselection of compatible cells may be unaffected. UE 200 may maintain an active eMBMS session for as long as possible until the reception quality of the serving cell falls below a specific threshold, which may indicate that the reception quality of the serving cell is unacceptable (e.g., may result in loss of paging channel).

In another exemplary aspect of the disclosure, UE 200 may be additionally configured to consider the reception quality of an active eMBMS stream in the decision to perform neighbor cell measurements and/or cell reselection to incompatible cells. For example, measurement/reselection control circuit 206 may receive a block error rate or audio/video decoding quality of an active eMBMS stream, and decide whether or not to initiate cell measurements and/or reselection to incompatible cells based on the received block error rate or audio/video decoding quality. As with the above-detailed examples, cell measurements and/or cell reselection to compatible cells may be unaffected.

For example, eMBMS processing circuit 210 may process mobile communication signal s in order to evaluate an eMBMS data stream contained therein. The eMBMS data stream may be encoded, and eMBMS processing circuit 210 may calculate a block error rate (BLER) of the active eMBMS data stream, such as e.g. by performing Forward Error Correction (FEC). eMBMS processing circuit 210 may then provide the calculate BLER to measurement/reselection control circuit 206 as BLER control signal. eMBMS processing circuit 210 may then provide video recording circuit 212 and/or video decoding circuit 214 with eMBMS_1 data stream, which may be the result of FEC decoding as performed by eMBMS processing circuit 210.

Measurement/reselection control circuit 206 may then consider the received BLER in addition the measured serving cell RSRP/RSRQ in the decision to initiate cell measurements and/or cell reselection to incompatible cells. For example, a user receiving an eMBMS stream may be moving towards the edge of the coverage area of the serving cell, and may be moving into the coverage area of an incompatible cell. eMBMS reception quality may thus decrease (along with measured serving cell RSRP/RSRQ), as UE 200 may be substantially far from the serving cell. However, performing reselection to a closer incompatible cell immediately may be undesirable, as the active eMBMS stream may be terminated upon reselection to an incompatible cell. Initiating cell measurements of incompatible neighbor cells may also be undesirable, as eMBMS reception quality may be negatively affected due to required measurement gaps.

A user may therefore wish to delay cell measurements and reselection to incompatible cells until necessary, e.g. until the loss of an active paging channel is possible, in order to maintain the active eMBMS stream for as long as possible. However, the active eMBMS stream may also suffer from poor performance as UE 200 moves further away from the serving cell. Accordingly, the eMBMS stream quality may fall to such an unacceptable level that a user no longer wishes to receive it, and thus termination of the active eMBMS stream in favor of cell measurements and/or cell reselection to incompatible cells is acceptable. UE 200 may therefore utilize eMBMS stream BLER to indicate the quality of the active eMBMS stream. If the BLER falls below a certain threshold, UE 200 may decide to trigger cell measurement and/or cell reselection to incompatible cells, depending on the measured serving cell RSRP/RSRQ values.

Accordingly, UE 200 may compare the calculated BLER to a BLER quality threshold to determine which set of thresholds to utilize for selection of one of actions 302-310. For example, if the calculated BLER falls below the BLER quality threshold, measurement/reselection control circuit 206 may determine that the reception quality of the eMBMS data stream is very poor, and accordingly it may be appropriate to terminate the active eMBMS data stream in favor of performing measurements and/or reselection to incompatible neighbor cells. Accordingly, the active eMBMS session may be discardable, and measurement/reselection control circuit 206 may treat the scenario as if no eMBMS stream is active. In other words, measurement/reselection control circuit 206 may compare the measured RSRP and/or RSRQ to network-provided measurement thresholds 312*a* and 312*b* and network-provided reselection thresholds 316*a* and 316*b*. Measurement/reselection control circuit 206 may then select to either take no measurement reselection action (action 302), to perform measurements on all candidate cells (action 306), or to attempt reselection for all candidate neighbor cells (action 310). Measurement/reselection control circuit 206 may thus ignore the active eMBMS stream, and proceed according to the network-provided thresholds.

Alternatively, if the calculated BLER is above the BLER quality threshold, measurement/reselection control circuit 206 may utilize both the network-provided thresholds and the alternate thresholds for comparison with the measured serving cell RSRP and RSRQ, as detailed in decision charts 300*a* and 300*b*. Measurement/reselection control circuit 206 may thus continue to treat the eMBMS stream as active, and accordingly may prioritize the active eMBMS stream over cell measurement and/or reselection of incompatible cells. Accordingly, measurement/reselection control circuit 206 may select one of actions 302-310 based on the comparison between the measured serving cell RSRP and RSRQ and thresholds 312*a*-318*a* and 312*b*-318*b*.

Figure 4:
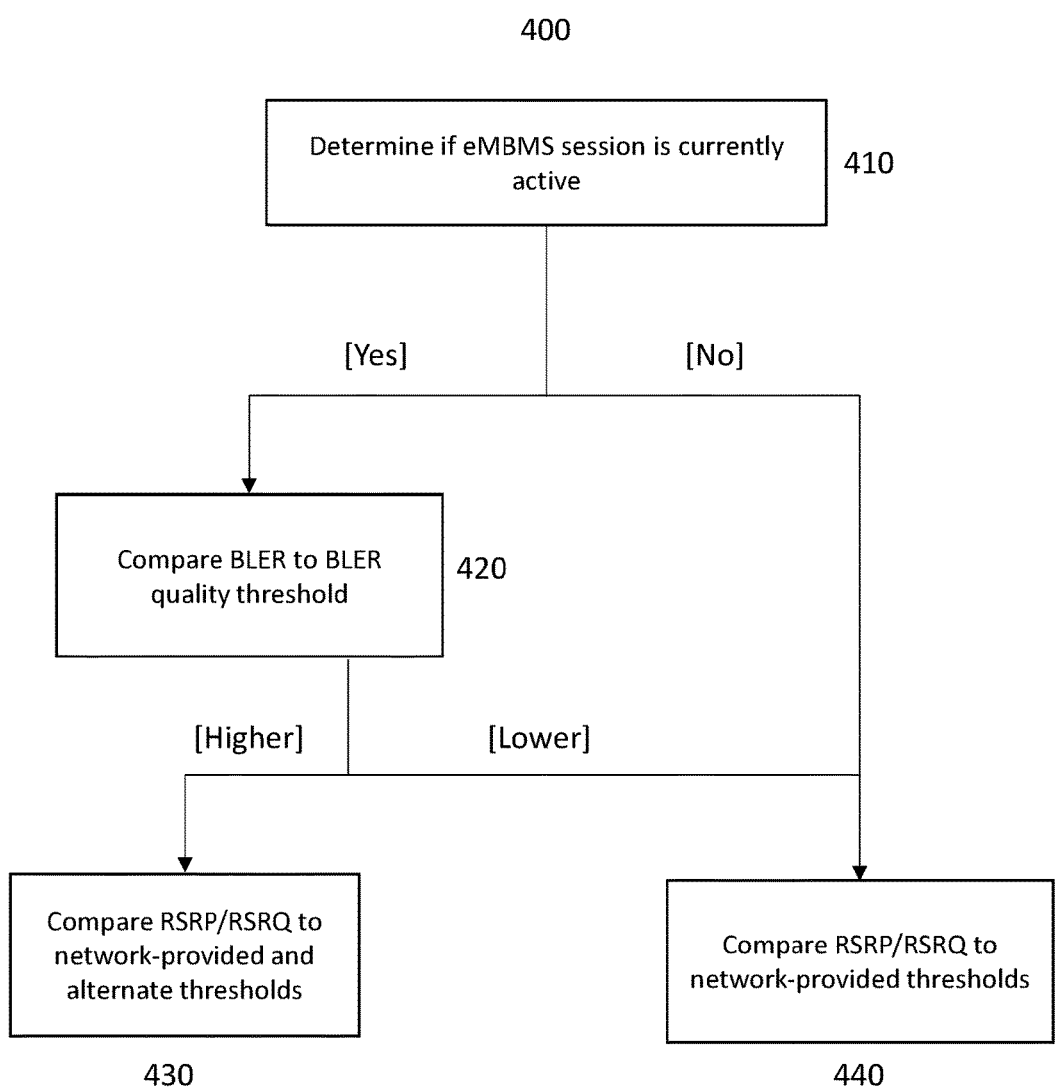
FIG. 4 shows a flow diagram illustrating a neighbor cell measurement/cell reselection process according to an exemplary aspect of the disclosure.

FIG. 4 illustrates process 400 for utilizing a measured BLER in determining whether or not to perform cell measurement and/or reselection, and determining which cells to perform cell measurement and/or reselection for.

In 410, process 400 may determine if an eMBMS session is currently active. If no eMBMS session is currently active, process 400 may compare the measured serving cell RSRP/RSRQ to the network-provided thresholds for comparison with the measured serving cell RSRP and RSRQ in 440. Alternatively, if an eMBMS session is active, process 400 may proceed to 420 to compare the calculated BLER to the BLER quality threshold. Process 400 may thus determine if the active eMBMS session is of sufficient quality and should be prioritized, or if the active eMBMS session is of poor quality and should be terminated.

If the calculated BLER is higher than the BLER quality threshold, process 400 may proceed to 430 to compare the measured serving cell RSRP/RSRQ to both the network-provided and alternate thresholds. Process 400 may then select one of actions 302-310 based on the comparison result, and accordingly may decide which candidate cells (if any) to perform cell measurements and/or reselection on based on whether or not the candidate cells are compatible or incompatible.

If the calculated BLER is lower than the BLER quality threshold, process 400 may proceed to 440 to compare the measured serving cell RSRP/RSRQ to the network-provided thresholds in order to select one of actions 302, 306, or 310. 440 may therefore treat the active eMBMS session as non-prioritized, and may accordingly prioritize cell measurements and/or cell reselection for incompatible cells (based on the RSRP/RSRQ) over maintenance of the active eMBMS session.

UE 200 may additionally be configured to utilize audio/video decoding quality in order to determine which cells, if any, to perform cell measurements and/or cell reselection for. UE 200 may determine an audio/video decoding quality and utilize the audio/video decoding quality in order to determine whether or not cell measurements and/or reselection of compatible and/or incompatible cells are appropriate.

As shown in FIG. 2, UE 200 may be additionally provided with video recording circuit 212 and video decoding circuit 214. Video recording circuit 212 and video decoding circuit 214 may both be provided with an eMBMS_1 data stream as shown in FIG. 2. Although video recording circuit 212 and video decoding circuit 214 will be further described as storing and processing eMBMS video data, it is understood that both video recording circuit 212 and video decoding circuit 214 may be similarly configured to store and process commercial radio data or other types of eMBMS data streams.

The eMBMS data in eMBMS_1 data stream may either be shown directly to a user or recorded for later use. Accordingly, video recording circuit 212 may be provided to record the encoded eMBMS data streams for later viewing. Video recording circuit 212 may therefore be implemented with a memory device.

Video decoding circuit 214 may be configured to perform video decoding on an eMBMS data stream in order to provide eMBMS data to a user. For example, video decoding circuit 214 may receive either eMBMS_1 data stream from eMBMS processing circuit 210 or eMBMS 2 data stream from video recording circuit 212. Video decoding circuit 214 may then perform video decoding on the received eMBMS data stream and provide the decoded eMBMS stream as video and/or audio to another component (not shown) of UE 200, such as a display device or other user output device. Video decoding circuit 214 may therefore provide either a live eMBMS stream by decoding eMBMS_1 data stream received from eMBMS processing circuit 210 or provide a recorded eMBMS stream by decoding eMBMS 2 data stream received from video recording circuit 212.

In addition to performing eMBMS data stream decoding, video decoding circuit 214 may determine an audio/video decoder quality, which may represent the quality of audio and video decoding as performed on the encoded eMBMS data stream by video decoding circuit 214. This audio/video decoder quality may be provided to measurement/reselection control circuit 206 as A/V_quality control signal. Measurement/reselection control circuit 206 may then utilize the received A/V_quality control signal to determine if neighbor cell measurements and/or cell reselection should be performed on incompatible cells.

Measurement/reselection control circuit 206 may utilize the received A/V_quality in a similar manner as the provided BLER. For example, UE 200 may wish to determine the eMBMS stream quality that is being provided to a user. If UE 200 is moving outside of the eMBMS stream coverage area into the coverage area of incompatible cells, the user may wish to continue to access the active eMBMS stream for as long as possible, and accordingly may wish to prioritize the active eMBMS stream over performing cell measurements and/or cell reselection to incompatible neighbor cells. However, once the stream quality of the active eMBMS stream becomes substantially degraded, the user may wish to terminate the active eMBMS stream. If no compatible cells have been found for reselection, UE 200 may thus seek reselection to incompatible cells in order to maintain a suitable radio link with the network.

Consequently, UE 200 may utilize an A/V decoding quality to determine the stream quality of the active eMBMS stream. Video decoding circuit 214 may therefore provide measurement/reselection control circuit 206 with A/V_quality control signal, which measurement/reselection control circuit 206 may use for measurement and/or reselection decisions. Similarly to as detailed regarding the use of BLER, measurement/reselection control circuit 206 may utilize the received A/V decoding quality in the decision to perform cell measurements and/or reselection with incompatible cells. Cell measurements and/or reselection to compatible cells may therefore remain unaffected.

For example, measurement/reselection control circuit 206 may compare the A/V decoding quality received from video decoding circuit 214 to an A/V decoding quality threshold. If the A/V decoding quality falls below the A/V decoding quality threshold, measurement/reselection control circuit 206 may determine that the stream quality of the active eMBMS stream has reached unacceptably low levels, and accordingly the active eMBMS stream may be terminated in favor of cell measurements and/or reselection with incompatible cells. If the A/V decoding quality exceeds the A/V decoding quality threshold, measurement/reselection control circuit 206 may determine that the stream quality of the active eMBMS stream is sufficient, and should therefore be prioritized over cell measurements and/or reselection to incompatible cells.

In other words, measurement/reselection control circuit 206 may decide whether or not to prioritize eMBMS reception over cell measurement and/or cell reselection to incompatible cells based on the A/V decoding quality. Similarly to the implementation detailed regarding BLER, measurement/reselection control circuit 206 may prioritize eMBMS reception over cell measurement and/or reselection to incompatible cells by using an alternate set of serving cell RSRP/RSRQ thresholds to determine whether or not cell measurement and/or reselection to incompatible cells is appropriate if the A/V decoding quality exceeds the A/V decoding quality threshold. Alternatively, if the A/V decoding quality is less than the A/V decoding quality threshold, measurement/reselection control circuit 206 may utilize only the network-provided thresholds to determine whether or not measurement and/or reselection to incompatible cells is appropriate.

Figure 5:
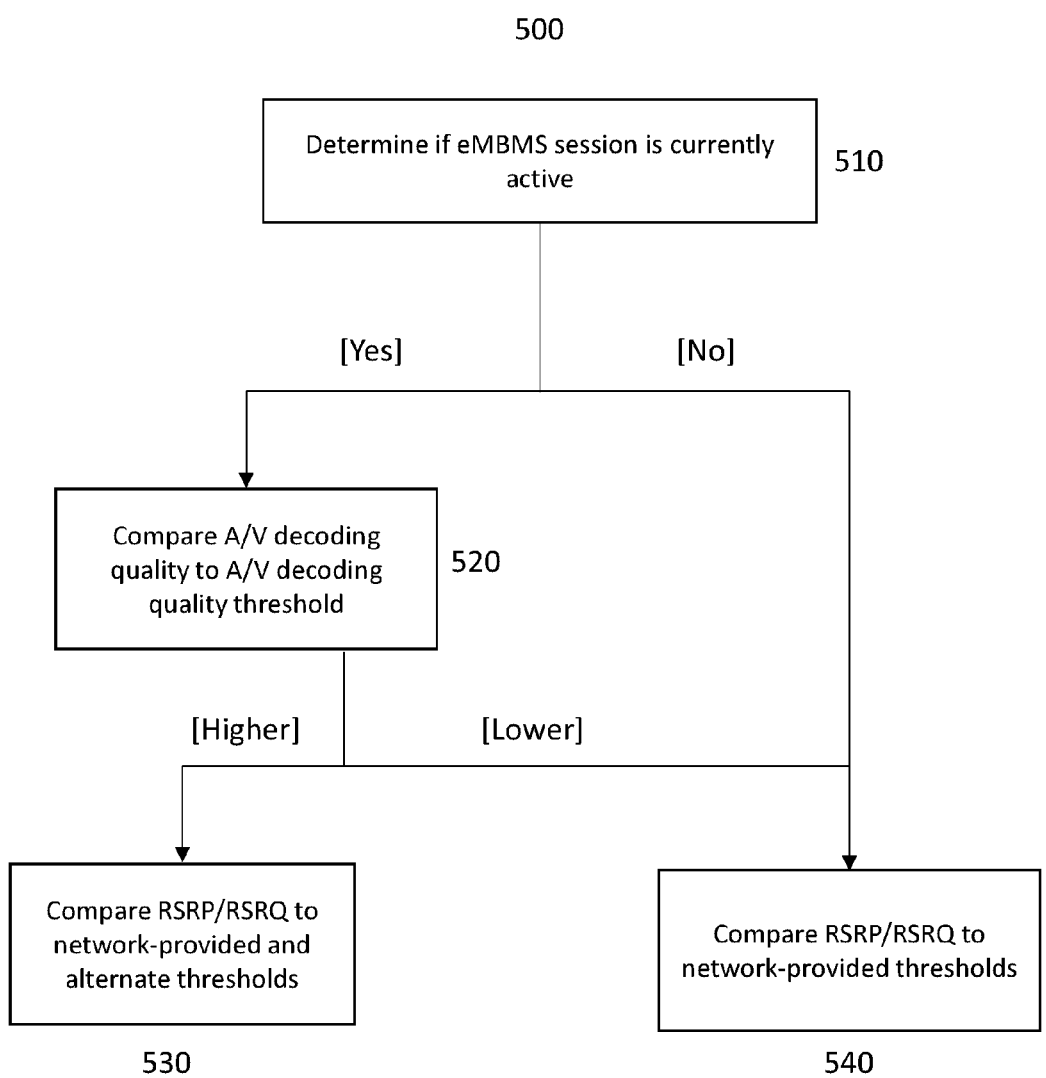
FIG. 5 shows a flow diagram illustrating a neighbor cell measurement/cell reselection process according to a second exemplary aspect of the disclosure.

FIG. 5 illustrates process 500 for utilizing an A/V decoding quality to determine whether or not to perform cell measurement and/or reselection, and to determine which cells to perform cell measurement and/or reselection for.

In 510, process 500 may determine if an eMBMS session is currently active. If no eMBMS session is active, process 500 may proceed to 540, and compare a measured serving cell RSRP/RSRQ to network-provided thresholds. If an eMBMS session is active, process 500 may proceed to 520, and compare the A/V decoding quality to the A/V decoding quality threshold. If the A/V decoding quality is higher than the A/V decoding quality threshold, process 500 may compare the serving cell RSRP/RSRQ to both network-provided and alternate thresholds in order to determine which cells, if any, to perform cell measurements and/or reselection for. Accordingly, process 500 may utilize signal power thresholds 312a-318a and signal quality thresholds 312b-318b in order to select one of actions 302-310 to perform. As the network-provided measurement and reselection thresholds may be higher than the alternate measurement and reselection thresholds, process 500 may thus prioritize eMBMS reception over cell measurements and/or reselection for incompatible cells.

If the A/V decoding quality is less than the A/V decoding quality threshold, process 500 may compare the serving cell RSRP/RSRQ only to the network-provided thresholds in 540. Process 500 may then proceed with decision charts 300a and 300b as if no eMBMS session is active, and select one of actions 302, 306, or 310. Process 500 may therefore not prioritize eMBMS reception over cell measurement and/or reselection to incompatible cells if the A/V decoding quality is less than the A/V decoding quality threshold.

Video decoding circuit 214 may thus be configured to perform decoding of eMBMS_1 data stream if a user is currently viewing an eMBMS stream. Video decoding circuit 214 may additionally be configured to perform decoding of eMBMS_1 data stream if a video stream is being recorded, e.g. if video recording circuit 212 is storing an eMBMS data stream contained in eMBMS_1 data stream. Video decoding circuit 214 may be configured to perform decoding both if the eMBMS stream being recorded is simultaneously being provided to a user or if the eMBMS stream is being recorded without being provided to the user (e.g. recorded for later viewing). Video decoding circuit 214 may be configured to calculate an A/V decoding quality in the aforementioned scenarios and provide the A/V decoding quality to measurement/reselection control circuit 206 as A/V_quality control signal. Accordingly, video decoding circuit 214 may be configured to perform A/V decoding of an eMBMS data stream contained in eMBMS_1 data stream in parallel to the eMBMS data stream being stored by video recording circuit 212. Video decoding circuit 214 may then provide measurement/reselection control circuit 206 with a resulting A/V decoding quality. Measurement/reselection control circuit 206 may therefore utilize the A/V decoding quality in order to determine which of actions 302-310 to perform based on either only network-provided thresholds or both network-provided thresholds and alternate thresholds. As detailed regarding FIG. 4, measurement/reselection control circuit 206 may similarly use a BLER in order to determine which of actions 302-310 to perform based on either only network-provided thresholds or both network-provided thresholds and alternate thresholds. UE 200 may additionally be configured to utilize both an A/V decoding quality and a BLER in order to determine whether to use either only network-provided thresholds or both network-provided thresholds and alternate thresholds. For example, measurement/reselection control circuit 206 may be configured to utilize only network-provided thresholds if either the A/V decoding quality falls below the A/V decoding quality threshold or the BLER falls below the BLER threshold, and to utilize both the network-provided thresholds and alternate thresholds otherwise. Alternatively, measurement/reselection control circuit 206 may be configured to utilize only network-provided thresholds only if both the A/V decoding quality falls below the A/V decoding quality threshold and the BLER falls below the BLER threshold, and to utilize both the network-provided thresholds and alternate thresholds otherwise.

UE 200 may accordingly be configured to prioritize reception of an eMBMS stream over cell measurements and/or reselection of incompatible cells by comparing a measured serving cell RSRP/RSRQ to both network provided RSRP/RSRQ thresholds and lower alternative RSRP/RSRQ thresholds. UE 200 may be configured to perform cell measurements and/or reselection of incompatible cells according to this priority based on the stream quality of an active eMBMS stream, such as e.g. indicated by an eMBMS BLER or A/V decoding quality.

If the eMBMS BLER and/or A/V decoding quality fall below respective BLER and A/V decoding quality thresholds, UE 200 may determine that the stream quality of an active eMBMS stream is poor, and accordingly prioritization of eMBMS reception over cell measurements and/or reselection of incompatible cells is no longer appropriate. UE 200 may then utilize only the network-provided RSRP/RSRQ thresholds to determine whether or not to perform cell measurements and/or reselection of all candidate cells, thereby removing any priority associated with cell measurements and/or reselection for incompatible cells.

Figure 6:
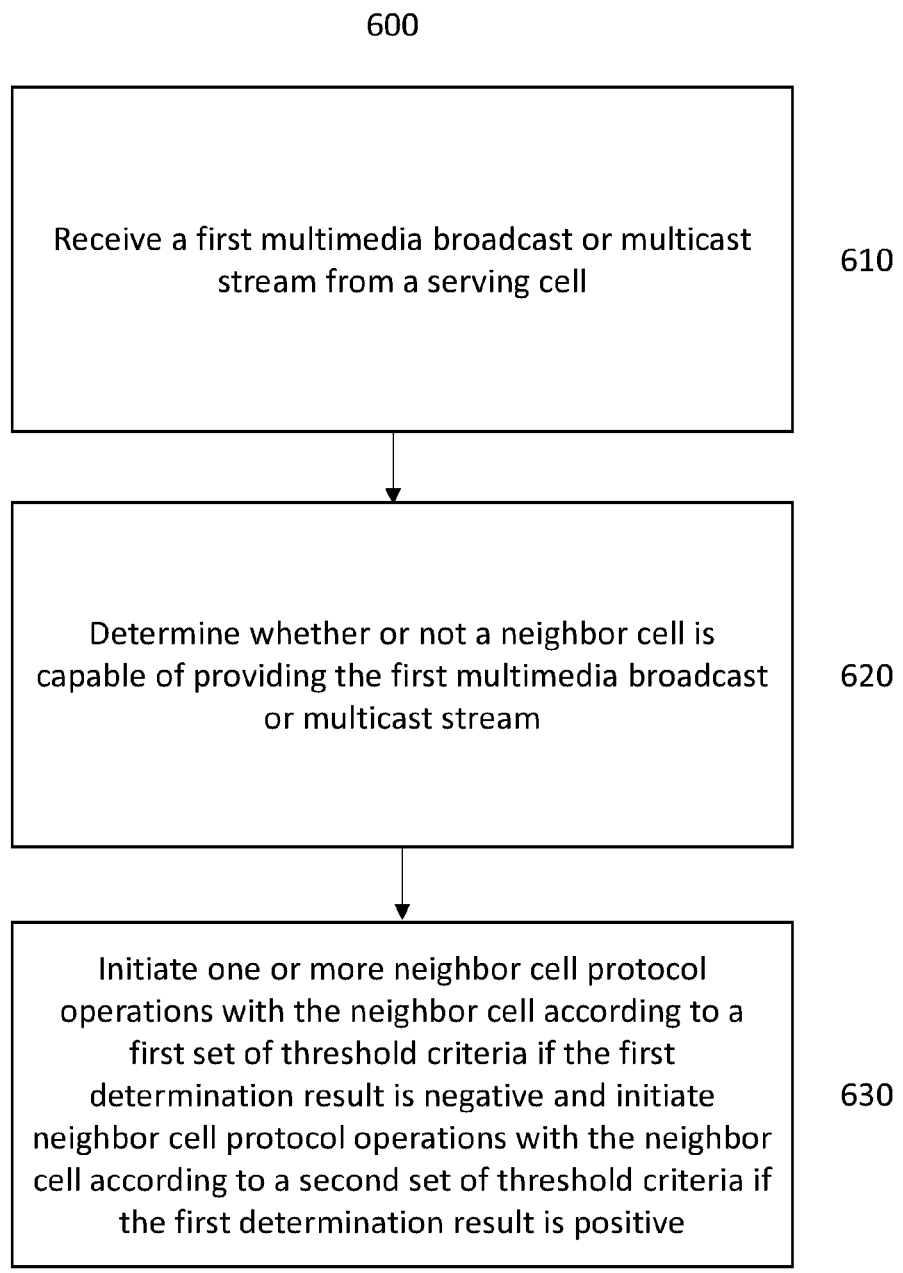
FIG. 6 shows a flow diagram illustrating a neighbor cell measurement/cell reselection process according to a third exemplary aspect of the disclosure.

FIG. 6 shows process 600 for performing mobile communications according to an aspect of the disclosure. In 610, process 600 may receive a first multimedia broadcast or multicast stream from a serving cell. Process 600 may then determine whether or not a neighbor cell is capable of providing the first multimedia broadcast or multicast stream in 620. Process 600 may then initiate one or more neighbor cell protocol operations with the neighbor cell according to a first set of threshold criteria if the first determination result is negative and initiate one or more neighbor cell protocol operations with the neighbor cell according to a second set of threshold criteria if the first determination result is positive in 630, wherein the one or more neighbor cell protocol operations may be one or more cell measurements or cell reselection. The multimedia broadcast or multicast stream may be an eMBMS stream.

Figure 7:
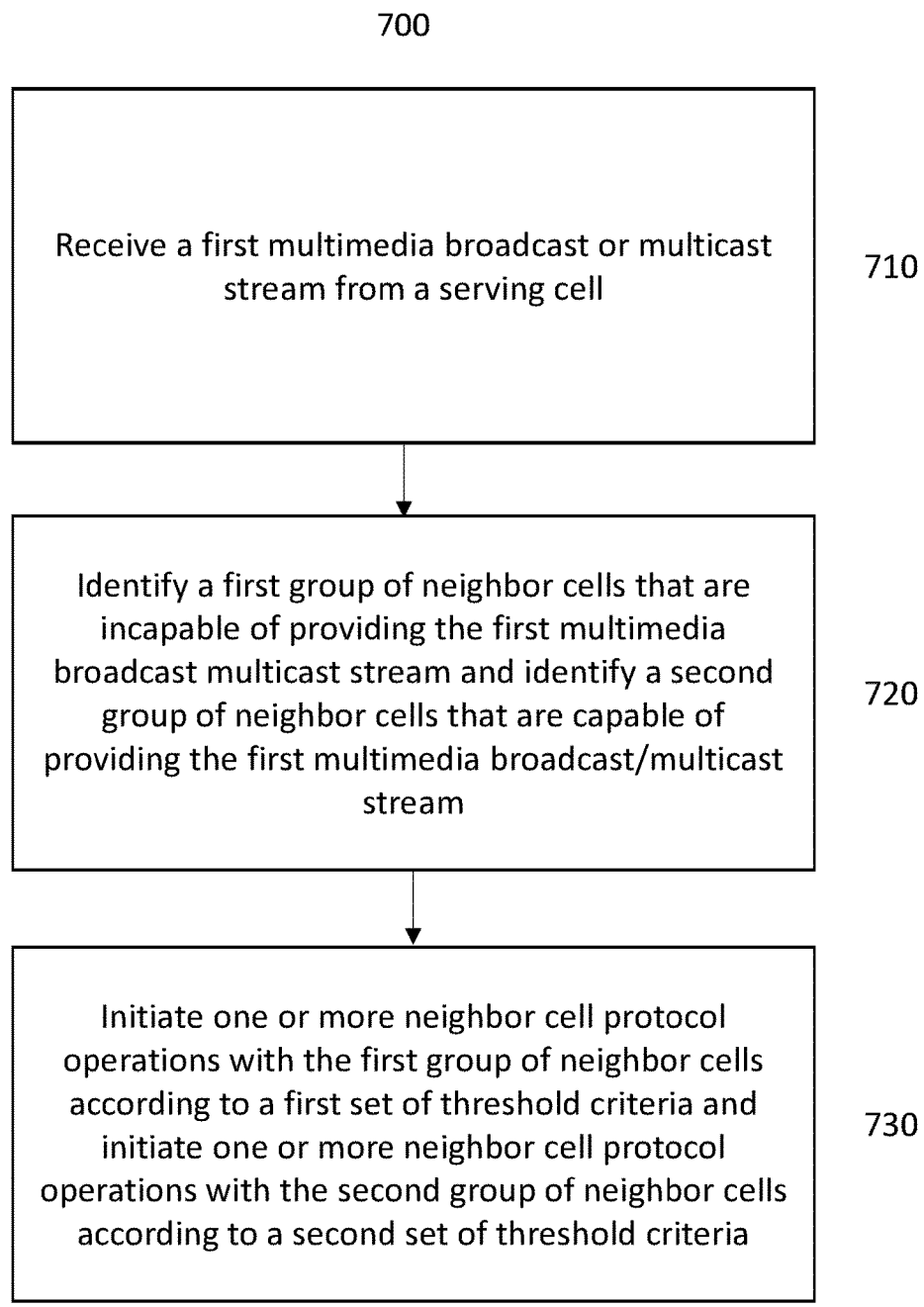
FIG. 7 shows a flow diagram illustrating a neighbor cell measurement/cell reselection process according to a fourth exemplary aspect of the disclosure.

FIG. 7 shows process 700 for performing mobile communications according to another aspect of the disclosure. In 710, process 700 may receive a first multimedia broadcast or multicast stream from a serving cell. Process 700 may then identify a first group of neighbor cells that are incapable of providing the first multimedia broadcast/multicast stream in 720. Process 700 may also identify a second group of neighbor cells that are capable of providing the first multimedia broadcast/multicast stream in 720. Process 700 may then initiate one or more neighbor cell protocol operations with the first group of neighbor cells according to a first set of threshold criteria and initiate one or more neighbor cell protocol operations with the second group of neighbor cells according to a second set of threshold criteria in 730, where the one or more neighbor cell protocol operations may be one or more cell measurements or cell reselection. The multimedia broadcast or multicast stream may be an eMBMS stream.

Figure 8:
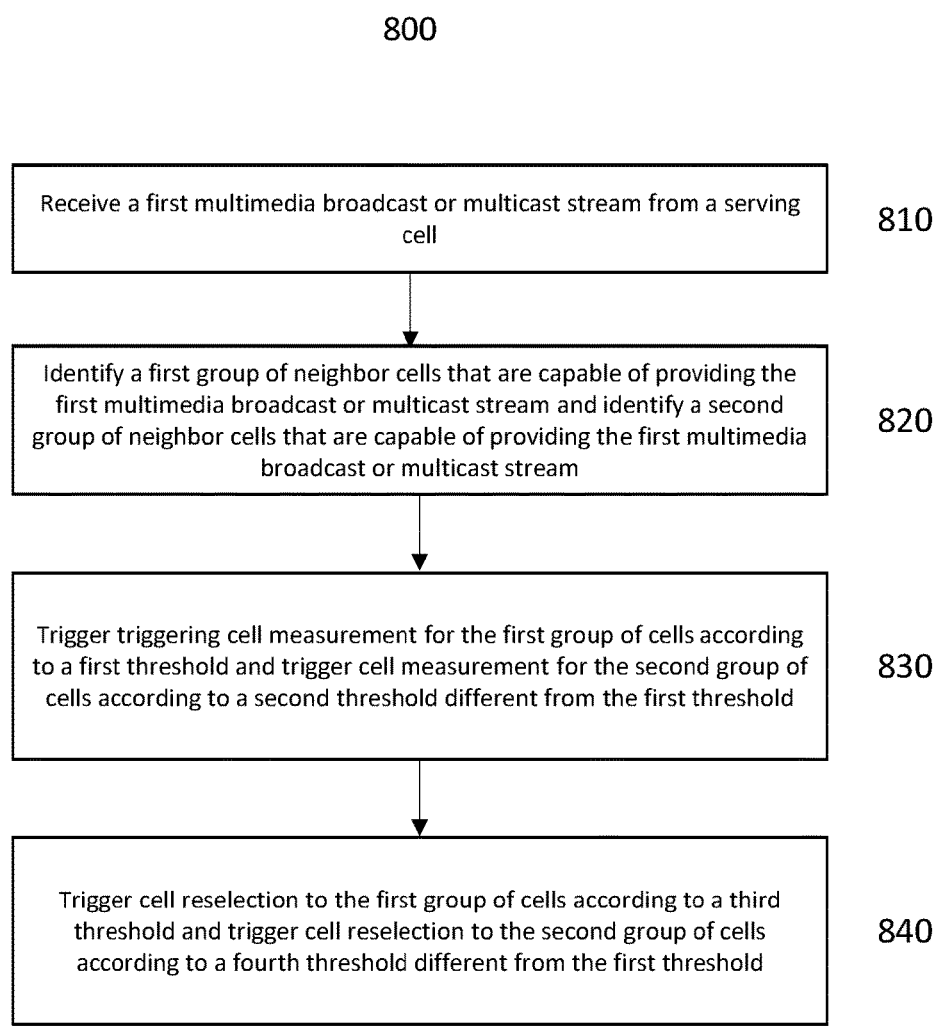

FIG. 8 shows process 800 for performing mobile communications according to a another aspect of the disclosure. As shown in FIG. 8, process 800 may include receiving a first multimedia broadcast or multicast stream from a serving cell (810), identifying a first group of neighbor cells that are capable of providing the first multimedia broadcast or multicast stream and identifying a second group of neighbor cells that are capable of providing the first multimedia broadcast or multicast stream (820), triggering cell measurement for the first group of cells according to a first threshold and triggering cell measurement for the second group of cells according to a second threshold different from the first threshold (830), and triggering cell reselection to the first group of cells according to a third threshold and triggering cell reselection to the second group of cells according to a fourth threshold different from the first threshold (840).

According to an exemplary aspect of the disclosure, UE 200 may be a radio terminal communication terminal device. UE 200 may include a receiver (RF transceiver 204) and a processing circuit (measurement/reselection control circuit 206). The receiver may be configured to receive a first multimedia broadcast/multicast stream from a serving cell. The processing circuit may be configured to determine whether or not a neighbor cell is capable of providing the first multimedia broadcast/multicast stream to generate a first determination result, and initiate one or more neighbor cell protocol operations with the neighbor cell according to a first set of threshold criteria if the first determination result is negative and to initiate one or more neighbor cell protocol operations with the neighbor cell according to a second set of threshold criteria if the first determination result is positive. The one or more neighbor cell protocol operations may be one or more cell measurements or cell reselection. UE 200 may further include a signal measurement circuit, an error correction circuit, and a decoding circuit.

According to another exemplary aspect of the disclosure, the processing circuit of may be configured to identify a first group of neighbor cells that are incapable of providing the first multimedia broadcast/multicast stream and identify a second group of neighbor cells that are capable of providing the first multimedia broadcast/multicast stream, and initiate one or more neighbor cell protocol operations with the first group of neighbor cells according to a first set of threshold criteria and initiate one or more neighbor cell protocol operations with the second group of neighbor cells according to a second set of threshold criteria. The one or more neighbor cell protocol operations may be one or more cell measurements or cell reselection.

While specific examples and approaches have been provided that detail the use of serving cell reception quality and eMBMS quality with threshold comparisons, the provided examples are not limiting in nature. One or more of the provided criteria, such as serving cell RSRP, serving cell RSRQ, eMBMS FEC BER, and eMBMS audio/video decoding quality, may be used in isolation or in conjunction with one or more of the other provided criteria in the decision to perform neighbor cell measurements and/or cell reselection of cells that do not support eMBMS. Accordingly, it is understood that a number of different and unique combinations criteria may be employed in the decision to perform neighbor cell measurements and/or cell reselection of cells that do not support eMBMS, and the examples contained herein are intended to be wholly exemplary in nature and not an exhaustive description of all possible approaches of utilizing such serving cell reception quality and eMBMS quality.

The following examples pertain to further aspects of this disclosure:

Example 1 is a method for performing mobile communications. The method includes receiving a first multimedia broadcast/multicast stream from a serving cell; determining whether or not a neighbor cell is capable of providing the first multimedia broadcast/multicast stream to generate a first determination result; and initiating neighbor cell protocol operations with the neighbor cell according to a first set of threshold criteria if the first determination result is negative and initiating neighbor cell protocol operations with the neighbor cell according to a second set of threshold criteria if the first determination result is positive, wherein the neighbor cell protocol operations are cell measurements of the neighbor cell or cell reselection to the neighbor cell.

In Example 2, the subject matter of Example 1 can optionally include determining a positive first determination result if the neighbor cell is capable of providing the first multimedia broadcast/multicast stream; and determining a negative first determination result if the neighbor cell is not capable of providing the first multimedia broadcast/multicast stream.

In Example 3, the subject matter of Example 1 can optionally include wherein the second set of threshold criteria comprises a network-provided signal power threshold and a network-provided signal quality threshold.

In Example 4, the subject matter of Example 3 can optionally include measuring a signal power and a signal quality of a wireless signal received from the serving cell, and wherein the initiating neighbor cell protocol operations with the neighbor cell according to a second set of threshold criteria if the first determination result is positive includes comparing the measured signal power to the network-provided signal power threshold and the measured signal quality to the network-provided signal quality threshold; and performing neighbor cell protocol operations based on whether the measured signal power exceeds the network-provided signal power threshold and the measured signal quality exceeds the network-provided signal quality threshold.

In Example 5, the subject matter of Example 3 can optionally include wherein the first set of threshold criteria comprises an alternate signal power threshold and an alternate signal quality threshold, and wherein the alternate signal power threshold is less than the network-provided signal power threshold and the alternate signal quality threshold is less than the network-provided signal quality threshold.

In Example 6, the subject matter of Example 1 can optionally include measuring a signal power of a wireless signal received from the serving cell, and wherein the initiating neighbor cell protocol operations with the neighbor cell according to a first set of threshold criteria if the first determination result is negative includes performing cell measurements of the neighbor cell if the measured signal power is less than a signal power measurement threshold of the first set of threshold criteria and greater than a signal power reselection threshold of the first set of threshold criteria; and performing cell reselection to the neighbor cell if the measured signal power is less than the signal power reselection threshold of the first set of threshold criteria.

In Example 7, the subject matter of Example 6 can optionally include wherein the signal power measurement threshold is greater than the signal power reselection threshold.

In Example 8, the subject matter of Example 1 can optionally include measuring a signal quality of a wireless signal received from the serving cell; and wherein the initiating neighbor cell protocol operations with the neighbor cell according to a first set of threshold criteria if the first determination result is negative performing cell measurements of the neighbor cell if the measured signal quality is less than a signal quality measurement threshold of the first set of threshold criteria and greater than a signal quality reselection threshold of the first set of threshold criteria; and performing cell reselection to the neighbor cell if the measured signal quality is less than the signal quality reselection threshold of the first set of threshold criteria.

In Example 9, the subject matter of Example 6 can optionally include wherein the signal quality measurement threshold is greater than the signal quality reselection threshold.

In Example 10, the subject matter of Example 1 can optionally include measuring a block error rate of the first multimedia broadcast/multicast stream; and wherein the initiating neighbor cell protocol operations with the neighbor cell according to a first set of threshold criteria if the first determination result is negative includes performing cell measurements of the neighbor cell if the measured block error rate is less than a block error rate measurement threshold of the first set of threshold criteria and greater than a block error rate reselection threshold of the first set of threshold criteria; and performing cell reselection to the neighbor cell if the measured block error rate is less than the block error rate reselection threshold of the first set of threshold criteria.

In Example 11, the subject matter of Example 10 can optionally include wherein the block error rate measurement threshold is greater than the block error rate reselection threshold.

In Example 12, the subject matter of Example 1 can optionally include measuring a decoding quality of the first multimedia broadcast/multicast stream; and wherein the initiating neighbor cell protocol operations with the neighbor cell according to a first set of threshold criteria if the first determination result is negative includes performing cell measurements of the neighbor cell if the measured decoding quality is less than a decoding quality measurement threshold of the first set of threshold criteria and greater than a decoding quality reselection threshold of the first set of threshold criteria; and performing cell reselection to the neighbor cell if the measured decoding quality is less than the decoding quality reselection threshold of the first set of threshold criteria.

In Example 13, the subject matter of Example 10 can optionally include wherein the decoding quality measurement threshold is greater than the decoding quality reselection threshold.

In Example 14, the subject matter of Example 1 can optionally include measuring a signal power of a wireless signal received from the serving cell, and wherein the initiating neighbor cell protocol operations with the neighbor cell according to a first set of threshold criteria if the first determination result is negative includes performing cell measurements on the neighbor cell or performing cell reselection to the neighbor cell based on a comparison between the measured signal power and the first set of threshold criteria.

In Example 15, the subject matter of Example 1 can optionally include measuring a signal quality of a wireless signal received from the serving cell, and wherein the initiating neighbor cell protocol operations with the neighbor cell according to a first set of threshold criteria if the first determination result is negative includes performing cell measurements on the neighbor cell or performing cell reselection to the neighbor cell based on a comparison between the measured signal quality and the first set of threshold criteria.

In Example 16, the subject matter of Example 1 can optionally include measuring a signal power and a signal quality of a wireless signal received from the serving cell; and wherein the initiating neighbor cell protocol operations with the neighbor cell according to a first set of threshold criteria if the first determination result is negative and initiating neighbor cell protocol operations with the neighbor cell according to a second set of threshold criteria if the first determination result is positive includes comparing the measured signal power and the measured signal quality to the first set of threshold criteria if the first determination result is negative or comparing the measured signal power and the measured signal quality to the second threshold criteria if the first determination result is positive.

In Example 17, the subject matter of Example 16 can optionally include wherein the first set of threshold criteria comprises a first signal power threshold and a first signal quality threshold and the second set of threshold criteria comprises a second signal power threshold and a second signal quality threshold.

In Example 18, the subject matter of Example 17 can optionally include wherein the first signal power threshold is less than the second signal power threshold and the first signal quality threshold is less than the second signal quality threshold.

In Example 19, the subject matter of Example 18 can optionally include wherein the initiating neighbor cell protocol operations with the neighbor cell according to a first set of threshold criteria if the first determination result is negative includes performing neighbor cell measurements of the neighbor cell only if the measured signal power is less than the first signal power threshold and the measured signal quality is less than the first signal quality threshold.

In Example 20, the subject matter of Example 1 can optionally include measuring one or more signal characteristics of a wireless signal received from the serving cell; wherein the initiating neighbor cell protocol operations with the neighbor cell according to a first set of threshold criteria if the first determination result is negative includes comparing the one or more signal characteristics to the first set of threshold criteria; and performing cell measurements of the neighbor cell or performing cell reselection to the neighbor cell based on whether the one or more signal characteristics meets the first set of threshold criteria.

In Example 21, the subject matter of Example 20 can optionally include wherein the first set of threshold criteria comprises a measurement threshold and a reselection threshold that is less than the measurement threshold, and wherein the performing cell measurements of the neighbor cell or performing cell reselection to the neighbor cell based on whether the one or more signal characteristics meets the first set of threshold criteria includes performing cell measurements of the neighbor cell if a first signal characteristic of the one or more signal characteristics is less than the measurement threshold and greater than the reselection threshold; and performing cell reselection to the neighbor cell if the first signal characteristic is less than the reselection threshold.

In Example 22, the subject matter of Example 21 can optionally include wherein the first signal characteristic is a signal power, a signal quality, a block error rate, or a decoding quality.

In Example 23, the subject matter of Example 21 can optionally include wherein the first signal characteristic is a block error rate or a decoding quality, and further including determining the first signal characteristic based on the first multimedia broadcast/multicast stream.

In Example 24, the subject matter of Examples 1 to 23 can optionally include wherein the first multimedia broadcast/multicast stream is an enhanced Multimedia Broadcast/multicast Services (eMBMS) stream.

In Example 25, the subject matter of Example 24 can optionally include wherein the determining whether or not a neighbor cell is capable of providing the first multimedia broadcast/multicast stream to generate a first determination result includes generating a positive determination result if the neighbor cell is transmitting the first multimedia broadcast/multicast stream; and generating a positive determination result if the neighbor cell is not transmitting the first multimedia broadcast/multicast stream.

In Example 26, the subject matter of Example 1 can optionally include performing neighbor cell protocol operations for one or more further neighbor cells that are capable of providing the first multimedia broadcast/multicast stream.

Example 27 is a method for performing mobile communications. The method includes receiving a first multimedia broadcast/multicast stream from a serving cell; identifying a first group of neighbor cells that are incapable of providing the first multimedia/multicast stream and identifying a second group of neighbor cells that are capable of providing the first multimedia broadcast/multicast stream; and initiating neighbor cell protocol operations with the first group of neighbor cells according to a first set of threshold criteria and initiating neighbor cell protocol operations with the second group of neighbor cells according to a second set of threshold criteria, wherein the neighbor cell protocol operations are cell measurements of the neighbor cells or cell reselection to the neighbor cells.

In Example 28, the subject matter of Example 27 can optionally include wherein the identifying a first group of neighbor cells that are capable of providing the first multimedia broadcast/multicast stream and identifying a second group of neighbor cells that are incapable of providing the first multimedia broadcast/multicast stream includes identifying neighbor cells that are currently transmitting the first multimedia broadcast/multicast stream as neighbor cells in the first group of neighbor cells; and identifying neighbor cells that are not currently transmitting the first multimedia broadcast/multicast stream as neighbor cells in the second group of neighbor cells.

In Example 29, the subject matter of Example 28 can optionally include wherein the second set of threshold criteria comprises a network-provided signal power threshold and a network-provided signal quality threshold.

In Example 30, the subject matter of Example 29 can optionally include measuring a signal power and a signal quality of a wireless signal received from the serving cell, and wherein the initiating neighbor cell protocol operations with the second group of neighbor cells includes comparing the measured signal power to the network-provided signal power threshold and the measured signal quality to the network-provided signal quality threshold; and performing neighbor cell protocol operations with the second group of neighbor cells based on whether or not the measured signal power exceeds the network-provided signal power threshold and the measured signal quality exceeds the network-provided signal quality threshold.

In Example 31, the subject matter of Example 29 can optionally include wherein the first set of threshold criteria includes an alternate signal power threshold and an alternate signal quality threshold, and wherein the alternate signal power threshold is less than the network-provided signal power threshold and the alternate signal quality threshold is less than the network-provided signal quality threshold.

In Example 32, the subject matter of Example 27 can optionally include measuring a signal power of a wireless signal received from the serving cell, and wherein the initiating neighbor cell protocol operations with the first group of neighbor cells according to the first set of threshold criteria includes performing cell measurements of one or more of the neighbor cells in the first group of neighbor cells if the measured signal power is less than a signal power measurement threshold of the first set of threshold criteria and greater than a signal power reselection threshold of the first set of threshold criteria; and performing cell reselection to a neighbor cell in the first group of neighbor cells if the measured signal power is less than the signal power reselection threshold of the first set of threshold criteria.

In Example 33, the subject matter of Example 32 can optionally include wherein the signal power measurement threshold is greater than the signal power reselection threshold.

In Example 34, the subject matter of Example 27 can optionally include measuring a signal quality of a wireless signal received from the serving cell; and wherein the initiating neighbor cell protocol operations with the first group of neighbor cells according to the first set of threshold criteria includes performing cell measurements of the one or more neighbor cells in the first group of neighbor cells if the measured signal quality is less than a signal quality measurement threshold of the first set of threshold criteria and greater than a signal quality reselection threshold of the first set of threshold criteria; and performing cell reselection to a neighbor cell in the first group of neighbor cells if the measured signal quality is less than the signal quality reselection threshold of the first set of threshold criteria.

In Example 35, the subject matter of Example 34 can optionally include wherein the signal quality measurement threshold is greater than the signal quality reselection threshold.

In Example 36, the subject matter of Example 27 can optionally include measuring a block error rate of the first multimedia broadcast/multicast stream, and wherein the initiating neighbor cell protocol operations with the first group of neighbor cells according to the first set of threshold criteria includes performing cell measurements of one or more neighbor cells in the first group of neighbor cells if the measured block error rate is less than a block error rate measurement threshold of the first set of threshold criteria and greater than a block error rate reselection threshold of the first set of threshold criteria; and performing cell reselection to a neighbor cell in the first group of neighbor cells if the measured block error rate is less than the block error rate reselection threshold of the first set of threshold criteria.

In Example 37, the subject matter of Example 36 can optionally include wherein the block error rate measurement threshold is greater than the block error rate reselection threshold.

In Example 38, the subject matter of Example 27 can optionally include measuring a decoding quality of the first multimedia broadcast/multicast stream; and wherein the initiating neighbor cell protocol operations with the first group of neighbor cells according to the first set of threshold criteria includes performing cell measurements of one or more neighbor cells in the first group of neighbor cells if the measured decoding quality is less than a decoding quality measurement threshold of the first set of threshold criteria and greater than a decoding quality reselection threshold of the first set of threshold criteria; and performing cell reselection to a neighbor cell in the first group of neighbor cells if the measured decoding quality is less than the decoding quality reselection threshold of the first set of threshold criteria.

In Example 39, the subject matter of Example 38 can optionally include wherein the decoding quality measurement threshold is greater than the decoding quality reselection threshold.

In Example 40, the subject matter of Example 27 can optionally include measuring a signal power of a wireless signal received from the serving cell, and wherein the initiating neighbor cell protocol operations with the first group of neighbor cells according to the first set of threshold criteria includes performing cell measurements on one or more neighbor cells in the first group of neighbor cells or performing cell reselection to a neighbor cell in the first group of neighbor cells based on a comparison between the measured signal power and the first set of threshold criteria.

In Example 41, the subject matter of Example 27 can optionally include measuring a signal quality of a wireless signal received from the serving cell, and wherein the initiating neighbor cell protocol operations with the first group of neighbor cells according to the first set of threshold criteria includes performing cell measurements on one or more of the neighbor cells in the first group of neighbor cells or performing cell reselection to a neighbor cell in the first group of neighbor cells based on a comparison between the measured signal quality and the first set of threshold criteria.

In Example 42, the subject matter of Example 27 can optionally include measuring a signal power and a signal quality of a wireless signal received from the serving cell; and wherein the initiating neighbor cell protocol operations with the first group of neighbor cells according to the first set of threshold criteria and initiating neighbor cell protocol operations with the second group of neighbor cells according to the second set of threshold criteria includes initiating neighbor cell protocol operations with the first group of neighbor cells based on whether or not the measured signal power and measured signal quality exceed one or more thresholds of the first set of threshold criteria; and initiating neighbor cell protocol operations with the second group of neighbor cells based on whether or not the measured signal power and measured signal quality exceed one or more thresholds of the second set of threshold criteria.

In Example 43, the subject matter of Example 42 can optionally include wherein the first set of threshold criteria includes a first signal power threshold and a first signal quality threshold and the second set of threshold criteria includes a second signal power threshold and a second signal quality threshold.

In Example 44, the subject matter of Example 43 can optionally include wherein the first signal power threshold is less than the second signal power threshold and the first signal quality threshold is less than the second signal quality threshold.

In Example 45, the subject matter of Example 44 can optionally include wherein the initiating neighbor cell protocol operations with the first group of neighbor cells according to the first set of threshold criteria includes performing neighbor cell measurements on one or more neighbor cells of the first group of neighbor cells only if the measured signal power is less than the first signal power threshold and the measured signal quality is less than the first signal quality threshold.

In Example 46, the subject matter of Example 27 can optionally include measuring one or more signal characteristics of a wireless signal received from the serving cell; and wherein the initiating neighbor cell protocol operations with the first group of neighbor cells according to the first set of threshold criteria includes comparing the one or more signal characteristics to the first set of threshold criteria; and performing cell measurements on one or more neighbor cells in the first group of neighbor cells or performing cell reselection to a neighbor cell in the first group of neighbor cells based on whether the one or more signal characteristics meets the first set of threshold criteria.

In Example 47, the subject matter of Example 46 can optionally include wherein the first set of threshold criteria comprises a measurement threshold and a reselection threshold that is less than the measurement threshold, and wherein the performing cell measurements on one or more neighbor cells of the first group of neighbor cells or performing cell reselection to a neighbor cell of the first group of neighbor cells based on whether the one or more signal characteristics meets the first set of threshold criteria includes performing cell measurements on one or more neighbor cells of the first group of neighbor cells if a first signal characteristic of the one or more signal characteristics is less than the measurement threshold and greater than the reselection threshold; and performing cell reselection to a neighbor cell of the first group of neighbor cells if the first signal characteristic is less than the reselection threshold.

In Example 48, the subject matter of Example 47 can optionally include wherein the wherein the first signal characteristic is a signal power, a signal quality, a block error rate, or a decoding quality.

In Example 49, the subject matter of Example 47 can optionally include wherein the first signal characteristic is a block error rate or a decoding quality, and further including determining the first signal characteristic based on the first multimedia broadcast/multicast stream.

In Example 50, the subject matter of Examples 27 to 49 can optionally include wherein the first multimedia broadcast/multicast stream is an enhanced Multimedia Broadcast/multicast Services (eMBMS) stream.

In Example 51, the subject matter of Example 50 can optionally include wherein the identifying a first group of neighbor cells that are incapable of providing the first multimedia broadcast/multicast stream and identifying a second group of neighbor cells that are capable of providing the first multimedia broadcast/multicast stream includes identifying neighbor cells that are currently transmitting the first multimedia broadcast/multicast stream as neighbor cells in the first group of neighbor cells; and identifying neighbor cells that are not currently transmitting the first multimedia broadcast/multicast stream as neighbor cells in the second group of neighbor cells.

Example 52 is a mobile radio communication terminal device. The mobile radio communication terminal device includes a receiver configured to receive a first multimedia broadcast/multicast stream from a serving cell; and a processing circuit configured to determine whether or not a neighbor cell is capable of providing the first multimedia broadcast/multicast stream to generate a first determination result; and initiate neighbor cell protocol operations with the neighbor cell according to a first set of threshold criteria if the first determination result is negative and to initiate neighbor cell protocol operations with the neighbor cell according to a second set of threshold criteria if the first determination result is positive, wherein the neighbor cell protocol operations are cell measurements of the neighbor cell or cell reselection to the neighbor cell.

In Example 53, the subject matter of Example 52 can optionally include wherein the processing circuit is configured to determine a positive first determination result if the neighbor cell is capable of providing the first multimedia broadcast/multicast stream; and determine a negative first determination result if the neighbor cell is not capable of providing the first multimedia broadcast/multicast stream.

In Example 54, the subject matter of Example 52 can optionally include wherein the second set of threshold criteria includes a network-provided signal power threshold and a network-provided signal quality threshold.

In Example 55, the subject matter of Example 54 can optionally include a signal measurement circuit configured to measure a signal power and a signal quality of a wireless signal received from the serving cell, and wherein the processing circuit is configured to initiate neighbor cell protocol operations with the neighbor cell according to a second set of threshold criteria if the first determination result is positive by comparing the measured signal power to the network-provided signal power threshold and the measured signal quality to the network-provided signal quality threshold; and performing neighbor cell protocol operations based on whether the measured signal power exceeds the network-provided signal power threshold and the measured signal quality exceeds the network-provided signal quality threshold.

In Example 56, the subject matter of Example 55 can optionally include wherein the first set of threshold criteria includes an alternate signal power threshold and an alternate signal quality threshold, and wherein the alternate signal power threshold is less than the network-provided signal power threshold and the alternate signal quality threshold is less than the network-provided signal quality threshold.

In Example 57, the subject matter of Example 52 can optionally include a signal measurement circuit configured to measure a signal power of a wireless signal received from the serving cell, and wherein the processing circuit is configured to initiate neighbor cell protocol operations with the neighbor cell according to a first set of threshold criteria if the first determination result is negative by performing cell measurements of the neighbor cell if the measured signal power is less than a signal power measurement threshold of the first set of threshold criteria and greater than a signal power reselection threshold of the first set of threshold criteria; and performing cell reselection to the neighbor cell if the measured signal power is less than the signal power reselection threshold of the first set of threshold criteria.

In Example 58, the subject matter of Example 57 can optionally include wherein the signal power measurement threshold is greater than the signal power reselection threshold.

In Example 59, the subject matter of Example 52 can optionally include a signal measurement circuit configured to measure a signal quality of a wireless signal received from the serving cell, and wherein the processing circuit is configured to initiate neighbor cell protocol operations with the neighbor cell according to a first set of threshold criteria if the first determination result is negative by performing cell measurements of the neighbor cell if the measured signal quality is less than a signal quality measurement threshold of the first set of threshold criteria and greater than a signal quality reselection threshold of the first set of threshold criteria; and performing cell reselection to the neighbor cell if the measured signal quality is less than the signal quality reselection threshold of the first set of threshold criteria.

In Example 60, the subject matter of Example 59 can optionally include wherein the signal quality measurement threshold is greater than the signal quality reselection threshold.

In Example 61, the subject matter of Example 52 can optionally include an error correction circuit configured to measure a block error rate of the first multimedia broadcast/multicast stream, and wherein the processing circuit is configured to initiate neighbor cell protocol operations with the neighbor cell according to a first set of threshold criteria if the first determination result is negative by performing cell measurements of the neighbor cell if the measured block error rate is less than a block error rate measurement threshold of the first set of threshold criteria and greater than a block error rate reselection threshold of the first set of threshold criteria; and performing cell reselection to the neighbor cell if the measured block error rate is less than the block error rate reselection threshold of the first set of threshold criteria.

In Example 62, the subject matter of Example 61 can optionally include wherein the block error rate measurement threshold is greater than the block error rate reselection threshold.

In Example 63, the subject matter of Example 52 can optionally include a signal decoding circuit configured to measure a decoding quality of the first multimedia broadcast/multicast stream, and wherein the processing circuit is configured to initiate neighbor cell protocol operations with the neighbor cell according to a first set of threshold criteria if the first determination result is negative by performing cell measurements of the neighbor cell if the measured decoding quality is less than a decoding quality measurement threshold of the first set of threshold criteria and greater than a decoding quality reselection threshold of the first set of threshold criteria; and performing cell reselection to the neighbor cell if the measured decoding quality is less than the decoding quality reselection threshold of the first set of threshold criteria.

In Example 64, the subject matter of Example 63 can optionally include wherein the decoding quality measurement threshold is greater than the decoding quality reselection threshold.

In Example 65, the subject matter of Example 52 can optionally include a signal measurement circuit configured to measure a signal power of a wireless signal received from the serving cell, and wherein the processing circuit is configured to initiate neighbor cell protocol operations with the neighbor cell according to a first set of threshold criteria if the first determination result is negative by performing cell measurements on the neighbor cell or performing cell reselection to the neighbor cell based on a comparison between the measured signal power and the first set of threshold criteria.

In Example 66, the subject matter of Example 52 can optionally include a signal measurement circuit configured to measure a signal quality of a wireless signal received from the serving cell, and wherein the processing circuit is configured to initiate neighbor cell protocol operations with the neighbor cell according to a first set of threshold criteria if the first determination result is negative by performing cell measurements on the neighbor cell or performing cell reselection to the neighbor cell based on a comparison between the measured signal quality and the first set of threshold criteria.

In Example 67, the subject matter of Example 52 can optionally include a signal measurement circuit configured to measure a signal power and a signal quality of a wireless signal received from the serving cell, and wherein the processing circuit is configured to initiate neighbor cell protocol operations with the neighbor cell according to a first set of threshold criteria if the first determination result is negative and to initiate neighbor cell protocol operations with the neighbor cell according to a second set of threshold criteria if the first determination result is positive by comparing the measured signal power and the measured signal quality to the first set of threshold criteria if the first determination result is negative or comparing the measured signal power and the measured signal quality to the second threshold criteria if the first determination result is positive.

In Example 68, the subject matter of Example 67 can optionally include wherein the first set of threshold criteria includes a first signal power threshold and a first signal quality threshold and the second set of threshold criteria includes a second signal power threshold and a second signal quality threshold.

In Example 69, the subject matter of Example 67 can optionally include wherein the first signal power threshold is less than the second signal power threshold and the first signal quality threshold is less than the second signal quality threshold.

In Example 70, the subject matter of Example 69 can optionally include wherein the processing circuit is configured to initiate neighbor cell protocol operations with the neighbor cell according to a first set of threshold criteria if the first determination result is negative by performing neighbor cell measurements of the neighbor cell only if the measured signal power is less than the first signal power threshold and the measured signal quality is less than the first signal quality threshold.

In Example 71, the subject matter of Example 52 can optionally include one or more measurement circuits configured to measure one or more signal characteristics of a wireless signal received from the serving cell, and wherein the processing circuit is configured to initiate neighbor cell protocol operations with the neighbor cell according to a first set of threshold criteria if the first determination result is negative by comparing the one or more signal characteristics to the first set of threshold criteria; and performing cell measurements of the neighbor cell or performing cell reselection to the neighbor cell based on whether the one or more signal characteristics meets the first set of threshold criteria.

In Example 72, the subject matter of Example 71 can optionally include wherein the first set of threshold criteria comprises a measurement threshold and a reselection threshold that is less than the measurement threshold, and wherein the processing circuit is configured to perform cell measurements of the neighbor cell or perform cell reselection to the neighbor cell based on whether the one or more signal characteristics meets the first set of threshold criteria by performing cell measurements of the neighbor cell if a first signal characteristic of the one or more signal characteristics is less than the measurement threshold and greater than the reselection threshold; and performing cell reselection to the neighbor cell if the first signal characteristic is less than the reselection threshold.

In Example 73, the subject matter of Example 72 can optionally include wherein the first signal characteristic is a signal power, a signal quality, a block error rate, or a decoding quality.

In Example 74, the subject matter of Example 72 can optionally include wherein the first signal characteristic is a block error rate or a decoding quality, and wherein a measurement circuit of the one or more measurement circuits is configured to determine the first signal characteristic based on the first multimedia broadcast/multicast stream.

In Example 75, the subject matter of Examples 52 to 74 can optionally include wherein the first multimedia broadcast/multicast stream is an enhanced Multimedia Broadcast/multicast Services (eMBMS) stream.

In Example 76, the subject matter of Example 75 can optionally include wherein the processing circuit is configured to determine whether or not a neighbor cell is capable of providing the first multimedia broadcast/multicast stream to generate a first determination result by generating a positive determination result if the neighbor cell is transmitting the first multimedia broadcast/multicast stream; and generating a positive determination result if the neighbor cell is not transmitting the first multimedia broadcast/multicast stream.

In Example 77, the subject matter of Example 52 can optionally include wherein the processing circuit is further configured to perform neighbor cell protocol operations for one or more further neighbor cells that are capable of providing the first multimedia broadcast/multicast stream.

Example 78 is a mobile radio communication terminal device. The mobile radio communication terminal device includes a receiver configured to receive a first multimedia broadcast/multicast stream from a serving cell; and a processing circuit configured to identify a first group of neighbor cells that are incapable of providing the first multimedia broadcast/multicast stream and identify a second group of neighbor cells that are capable of providing the first multimedia broadcast/multicast stream; and initiate neighbor cell protocol operations with the first group of neighbor cells according to a first set of threshold criteria and initiating neighbor cell protocol operations with the second group of neighbor cells according to a second set of threshold criteria, wherein the neighbor cell protocol operations are cell measurements of the neighbor cells or cell reselection to the neighbor cells.

In Example 79, the subject matter of Example 78 can optionally include wherein the processing circuit is configured to identify neighbor cells that are currently transmitting the first multimedia broadcast/multicast stream as neighbor cells in the first group of neighbor cells; and identify neighbor cells that are not currently transmitting the first multimedia broadcast/multicast stream as neighbor cells in the second group of neighbor cells.

In Example 80, the subject matter of Example 79 can optionally include wherein the second set of threshold criteria comprises a network-provided signal power threshold and a network-provided signal quality threshold.

In Example 81, the subject matter of Example 80 can optionally include a signal measurement circuit configured to measure a signal power and a signal quality of a wireless signal received from the serving cell, and wherein the processing circuit is configured to initiate neighbor cell protocol operations with the second group of neighbor cells by comparing the measured signal power to the network-provided signal power threshold and the measured signal quality to the network-provided signal quality threshold; and performing neighbor cell protocol operations with the second group of neighbor cells based on whether or not the measured signal power exceeds the network-provided signal power threshold and the measured signal quality exceeds the network-provided signal quality threshold.

In Example 82, the subject matter of Example 80 can optionally include wherein the first set of threshold criteria comprises an alternate signal power threshold and an alternate signal quality threshold, and wherein the alternate signal power threshold is less than the network-provided signal power threshold and the alternate signal quality threshold is less than the network-provided signal quality threshold.

In Example 83, the subject matter of Example 78 can optionally include a signal measurement circuit configured to measure a signal power of a wireless signal received from the serving cell, and wherein the processing circuit is configure to initiate neighbor cell protocol operations with the first group of neighbor cells according to the first set of threshold criteria by performing cell measurements of one or more of the neighbor cells in the first group of neighbor cells if the measured signal power is less than a signal power measurement threshold of the first set of threshold criteria and greater than a signal power reselection threshold of the first set of threshold criteria; and performing cell reselection to a neighbor cell in the first group of neighbor cells if the measured signal power is less than the signal power reselection threshold of the first set of threshold criteria.

In Example 84, the subject matter of Example 83 can optionally include wherein the signal power measurement threshold is greater than the signal power reselection threshold.

In Example 85, the subject matter of Example 78 can optionally include a signal measurement circuit configured to measure a signal quality of a wireless signal received from the serving cell, and wherein the processing circuit is configured to initiate neighbor cell protocol operations with the first group of neighbor cells according to the first set of threshold criteria by performing cell measurements of the one or more neighbor cells in the first group of neighbor cells if the measured signal quality is less than a signal quality measurement threshold of the first set of threshold criteria and greater than a signal quality reselection threshold of the first set of threshold criteria; and performing cell reselection to a neighbor cell in the first group of neighbor cells if the measured signal quality is less than the signal quality reselection threshold of the first set of threshold criteria.

In Example 86, the subject matter of Example 85 can optionally include wherein the signal quality measurement threshold is greater than the signal quality reselection threshold.

In Example 87, the subject matter of Example 78 can optionally include an error correction circuit configured to measure a block error rate of the first multimedia broadcast/multicast stream, and wherein the processing circuit is configured to initiate neighbor cell protocol operations with the first group of neighbor cells according to the first set of threshold criteria by performing cell measurements of one or more neighbor cells in the first group of neighbor cells if the measured block error rate is less than a block error rate measurement threshold of the first set of threshold criteria and greater than a block error rate reselection threshold of the first set of threshold criteria; and performing cell reselection to a neighbor cell in the first group of neighbor cells if the measured block error rate is less than the block error rate reselection threshold of the first set of threshold criteria.

In Example 88, the subject matter of Example 87 can optionally include wherein the block error rate measurement threshold is greater than the block error rate reselection threshold.

In Example 89, the subject matter of Example 78 can optionally include a decoding circuit configured to measure a decoding quality of the first multimedia broadcast/multicast stream, and wherein the processing circuit is configured to initiate neighbor cell protocol operations with the first group of neighbor cells according to the first set of threshold criteria by performing cell measurements of one or more neighbor cells in the first group of neighbor cells if the measured decoding quality is less than a decoding quality measurement threshold of the first set of threshold criteria and greater than a decoding quality reselection threshold of the first set of threshold criteria; and performing cell reselection to a neighbor cell in the first group of neighbor cells if the measured decoding quality is less than the decoding quality reselection threshold of the first set of threshold criteria.

In Example 90, the subject matter of Example 89 can optionally include wherein the decoding quality measurement threshold is greater than the decoding quality reselection threshold.

In Example 91, the subject matter of Example 78 can optionally include a signal measurement circuit configured to measure a signal power of a wireless signal received from the serving cell, and wherein the processing circuit is configured to initiate neighbor cell protocol operations with the first group of neighbor cells according to the first set of threshold criteria by performing cell measurements on one or more neighbor cells in the first group of neighbor cells or performing cell reselection to a neighbor cell in the first group of neighbor cells based on a comparison between the measured signal power and the first set of threshold criteria.

In Example 92, the subject matter of Example 78 can optionally include a signal measurement circuit configured to measure a signal power of a wireless signal received from the serving cell, and wherein the processing circuit is configured to initiate neighbor cell protocol operations with the first group of neighbor cells according to the first set of threshold criteria by performing cell measurements on one or more of the neighbor cells in the first group of neighbor cells or performing cell reselection to a neighbor cell in the first group of neighbor cells based on a comparison between the measured signal quality and the first set of threshold criteria.

In Example 93, the subject matter of Example 78 can optionally include a signal measurement circuit configured to measure a signal power and a signal quality of a wireless signal received from the serving cell, and wherein the processing circuit is configured to initiate neighbor cell protocol operations with the first group of neighbor cells according to the first set of threshold criteria and initiate neighbor cell protocol operations with the second group of neighbor cells according to the second set of threshold criteria by initiating neighbor cell protocol operations with the first group of neighbor cells based on whether or not the measured signal power and measured signal quality exceed one or more thresholds of the first set of threshold criteria; and initiating neighbor cell protocol operations with the second group of neighbor cells based on whether or not the measured signal power and measured signal quality exceed one or more thresholds of the second set of threshold criteria.

In Example 94, the subject matter of Example 93 can optionally include wherein the first set of threshold criteria includes a first signal power threshold and a first signal quality threshold and the second set of threshold criteria includes a second signal power threshold and a second signal quality threshold.

In Example 95, the subject matter of Example 94 can optionally include wherein the first signal power threshold is less than the second signal power threshold and the first signal quality threshold is less than the second signal quality threshold.

In Example 96, the subject matter of Example 95 can optionally include wherein the processing circuit is configured to initiate neighbor cell protocol operations with the first group of neighbor cells according to the first set of threshold criteria by performing neighbor cell measurements on one or more neighbor cells of the first group of neighbor cells only if the measured signal power is less than the first signal power threshold and the measured signal quality is less than the first signal quality threshold.

In Example 97, the subject matter of Example 78 can optionally include one or more measurement circuits configured to measure one or more signal characteristics of a wireless signal received from the serving cell, and wherein the processing circuit is configured to initiate neighbor cell protocol operations with the first group of neighbor cells according to the first set of threshold criteria by comparing the one or more signal characteristics to the first set of threshold criteria; and performing cell measurements on one or more neighbor cells in the first group of neighbor cells or performing cell reselection to a neighbor cell in the first group of neighbor cells based on whether the one or more signal characteristics meets the first set of threshold criteria.

In Example 98, the subject matter of Example 97 can optionally include wherein the first set of threshold criteria comprises a measurement threshold and a reselection threshold that is less than the measurement threshold, and wherein the processing circuit is configured to perform cell measurements on one or more neighbor cells of the first group of neighbor cells or perform cell reselection to a neighbor cell of the first group of neighbor cells based on whether the one or more signal characteristics meets the first set of threshold criteria by performing cell measurements on one or more neighbor cells of the first group of neighbor cells if a first signal characteristic of the one or more signal characteristics is less than the measurement threshold and greater than the reselection threshold; and performing cell reselection to a neighbor cell of the first group of neighbor cells if the first signal characteristic is less than the reselection threshold.

In Example 99, the subject matter of Example 98 can optionally include wherein the wherein the first signal characteristic is a signal power, a signal quality, a block error rate, or a decoding quality.

In Example 100, the subject matter of Example 98 can optionally include wherein the first signal characteristic is a block error rate or a decoding quality, and further including wherein a measurement circuit of the one or more measurement circuits is configured to determine the first signal characteristic based on the first multimedia broadcast/multicast stream.

In Example 101, the subject matter of Examples 78 to 100 can optionally include wherein the first multimedia broadcast/multicast stream is an enhanced Multimedia Broadcast/multicast Services (eMBMS) stream.

In Example 102, the subject matter of Example 101 can optionally include wherein the processing circuit is configured to identify a first group of neighbor cells that are incapable of providing the first multimedia broadcast/multicast stream and identify a second group of neighbor cells that are capable of providing the first multimedia broadcast/multicast stream by identifying neighbor cells that are currently transmitting the first multimedia broadcast/multicast stream as neighbor cells in the first group of neighbor cells; and identifying neighbor cells that are not currently transmitting the first multimedia broadcast/multicast stream as neighbor cells in the second group of neighbor cells.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile radio communication terminal device comprising:
    a receiver configured to receive a first multimedia broadcast or multicast stream from a serving cell;
    a measurement circuit configured to perform a signal measurement on the serving cell; and
    a processing circuit configured to:
    determine whether or not a neighbor cell is capable of providing the first multimedia broadcast or multicast stream;
    compare the signal measurement to a first threshold depending on whether the neighbor cell is capable of providing the first multimedia broadcast or multicast stream and compare the signal measurement to a second threshold less than the first threshold depending on whether the neighbor cell is not capable of providing the first multimedia broadcast or multicast stream; and
    trigger cell measurement of the neighbor cell depending on the comparison.

2. The mobile radio communication terminal device of claim 1,
    wherein the first threshold is a network-provided signal power threshold and the second threshold is an alternate signal power threshold.

3. The mobile radio communication terminal device of claim 1,
    wherein the signal measurement is a signal power,
    and wherein the processing circuit is configured to trigger cell measurement of the neighbor cell depending on the comparison by:
    performing one or more cell measurements of the neighbor cell if the signal power is less than the first threshold or the second threshold.

4. The mobile radio communication terminal device of claim 3, wherein the processing circuit is further configured to:
    compare the signal measurement to a third threshold less than the first threshold in the case that the neighbor cell is capable of providing the first multimedia broadcast or multicast stream and compare the signal measurement to a fourth threshold less than the second threshold in the case that the neighbor cell is not capable of providing the first multimedia broadcast or multicast stream; and
    trigger cell reselection to the neighbor cell if the signal measurement is less than the third threshold or the fourth threshold.

5. The mobile radio communication terminal device of claim 1,
    wherein the signal measurement is a signal quality,
    and wherein the processing circuit is configured to trigger measurement of the neighbor cell depending on the comparison by:
    performing one or more cell measurements of the neighbor cell if the signal quality is less than the first threshold or the second threshold.

6. The mobile radio communication terminal device of claim 1,
    wherein the signal measurement is a block error rate,
    and wherein the processing circuit is configured to trigger cell measurement of the neighbor cell depending on the comparison by:
    performing one or more cell measurements of the neighbor cell if the block error rate is less than the first threshold or the second threshold.

7. The mobile radio communication terminal device of claim 1,
    wherein the signal measurement is a decoding quality,
    and wherein the processing circuit is configured to trigger cell measurement of the neighbor cell depending on the comparison by:
    performing one or more cell measurements of the neighbor cell if the decoding quality is less than the first threshold or the second threshold.

8. The method of claim 1, wherein the first multimedia broadcast or multicast stream is an enhanced Multimedia Broadcast Multicast Services (eMBMS) stream.

9. A mobile radio communication terminal device comprising:
    a receiver configured to receive a first multimedia broadcast or multicast stream from a serving cell; and
    a processing circuit configured to:
    identify a first group of neighbor cells that are incapable of providing the first multimedia broadcast or multicast stream and identify a second group of neighbor cells that are capable of providing the first multimedia broadcast or multicast stream;
    trigger cell measurement for the first group of cells according to a first threshold and trigger cell measurement for the second group of cells according to a second threshold different from the first threshold; and
    trigger cell reselection to the first group of cells according to a third threshold and trigger cell reselection to the second group of cells according to a fourth threshold different from the first threshold.

10. The mobile radio communication terminal device of claim 9, wherein the processing circuit is configured to identify the first group of neighbor cells that are incapable of providing the first multimedia broadcast or multicast stream and identify the second group of neighbor cells that are capable of providing the first multimedia broadcast or multicast stream by:
    identifying neighbor cells that are not currently transmitting the first multimedia broadcast or multicast stream as neighbor cells in the first group of neighbor cells; and
    identifying neighbor cells that are currently transmitting the first multimedia broadcast or multicast stream as neighbor cells in the second group of neighbor cells.

11. The mobile radio communication device of claim 9, wherein the first threshold is higher than the second threshold and the third threshold is higher than the fourth threshold.

12. The mobile radio communication device of claim 9, wherein the first threshold is higher than the third threshold and the second threshold is higher than the fourth threshold.

13. The mobile radio communication device of claim 9, further comprising a measurement circuit configured to perform a signal measurement on the serving cell,
    wherein the processing circuit is configured to trigger cell measurement for the first group of cells according to the first threshold and trigger cell measurement for the second group of cells according to the second threshold different from the first threshold by:
    comparing the signal measurement to the first threshold and the second threshold; and
    triggering cell measurement of the first group of cells when the signal measurement is less than the first threshold and triggering cell measurement of the second group of cells when the signal measurement is less than the second threshold.

14. The mobile radio communication device of claim 9, further comprising a measurement circuit configured to perform a signal measurement on the serving cell,
    wherein the processing circuit is configured to trigger cell reselection to the first group of cells according to a third threshold and trigger cell reselection to the second group of cells according to the fourth threshold different from the third threshold by:
    comparing the signal measurement to the third threshold and the fourth threshold; and
    triggering cell reselection to the first group of cells when the signal measurement is less than the third threshold and triggering cell measurement of the second group of cells when the signal measurement is less than the fourth threshold.

15. The mobile radio communication terminal device of claim 14, wherein the signal measurement is a signal power, a signal quality, a block error rate, or a decoding quality.

16. The mobile radio communication terminal device of claim 9, wherein the first multimedia broadcast or multicast stream is an enhanced Multimedia Broadcast Multicast Services (eMBMS) stream.

17. A method of performing mobile communications comprising:
    receiving a first multimedia broadcast or multicast stream from a serving cell;
    identifying a first group of neighbor cells that are capable of providing the first multimedia broadcast or multicast stream and identifying a second group of neighbor cells that are capable of providing the first multimedia broadcast or multicast stream;
    triggering cell measurement for the first group of cells according to a first threshold and triggering cell measurement for the second group of cells according to a second threshold different from the first threshold; and
    triggering cell reselection to the first group of cells according to a third threshold and triggering cell reselection to the second group of cells according to a fourth threshold different from the first threshold.

18. The method of claim 17, wherein identifying the first group of neighbor cells that are capable of providing the first multimedia broadcast or multicast stream and identifying the second group of neighbor cells that are capable of providing the first multimedia broadcast or multicast stream comprises:
    identifying neighbor cells that are not currently transmitting the first multimedia broadcast or multicast stream as neighbor cells of the first group of neighbor cells; and
    identifying neighbor cells that are currently transmitting the first multimedia broadcast or multicast stream as neighbor cells in the second group of neighbor cells.

19. The method of claim 17, wherein the first threshold is higher than the second threshold and the third threshold is higher than the fourth threshold and wherein the first threshold is higher than the third threshold and the second threshold is higher than the fourth threshold.

20. The method of claim 17, wherein the first multimedia broadcast or multicast stream is an enhanced Multimedia Broadcast Multicast Services (eMBMS) stream.

* * * * *